(12) United States Patent
Zhang et al.

(10) Patent No.: US 10,614,073 B2
(45) Date of Patent: Apr. 7, 2020

(54) SYSTEM AND METHOD FOR USING DATA INCIDENT BASED MODELING AND PREDICTION

(71) Applicants: Xiaoping Zhang, Toronto (CA); David Kedmey, Brooklyn, NY (US); Fang Wang, Toronto (CA)

(72) Inventors: Xiaoping Zhang, Toronto (CA); David Kedmey, Brooklyn, NY (US); Fang Wang, Toronto (CA)

(73) Assignee: FinancialSharp, Inc., Toronto, Ontario (CA)

( * ) Notice: Subject to any disclaimer, the term of this patent is extended or adjusted under 35 U.S.C. 154(b) by 1302 days.

(21) Appl. No.: 14/750,669

(22) Filed: Jun. 25, 2015

(65) Prior Publication Data

US 2016/0019218 A1  Jan. 21, 2016

Related U.S. Application Data

(60) Provisional application No. 62/017,682, filed on Jun. 26, 2014, provisional application No. 62/091,865, filed on Dec. 15, 2014.

(51) Int. Cl.

| | |
|---|---|
| *G06F 16/2457* | (2019.01) |
| *G06F 16/242* | (2019.01) |
| *G06Q 40/04* | (2012.01) |
| *G06Q 10/04* | (2012.01) |
| *G06F 16/2458* | (2019.01) |

(52) U.S. Cl.
CPC ...... *G06F 16/2457* (2019.01); *G06F 16/2428* (2019.01); *G06F 16/2458* (2019.01); *G06Q 10/04* (2013.01); *G06Q 40/04* (2013.01); *G06F 2216/03* (2013.01)

(58) Field of Classification Search
CPC ............................ G06F 16/2458; G06Q 10/04
See application file for complete search history.

(56) References Cited

U.S. PATENT DOCUMENTS

| | | | |
|---|---|---|---|
| 7,653,594 B2 * | 1/2010 | Davis ................. | G06Q 30/0254 705/39 |
| 8,498,954 B2 * | 7/2013 | Malov ................ | G06Q 30/0201 706/45 |

(Continued)

*Primary Examiner* — Charles E Lu
(74) *Attorney, Agent, or Firm* — K&L Gates LLP

(57) ABSTRACT

A system and method for enabling information extraction from large data sets (so-called "big data") according to a new paradigm is disclosed. This system does not generate functions describing why certain inputs result in certain outputs. Instead, it creates incident mappings of inputs to outputs without regard to why inputs result in outputs. These mappings can be distributions or other data sets representative of different outcomes occurring. This enables several useful operations. For example, by providing a data set indicative of outputs that have historically occurred following a particular input, the disclosed system can be used to predict future outcomes with probabilities. For example, if a particular stock price pattern is provided as an input, the system generates an output data set indicating the probabilities of certain price behaviors following that input pattern. This data set can thus be used to predict future behavior. Other useful operations are disclosed herein.

15 Claims, 13 Drawing Sheets

(56) References Cited

U.S. PATENT DOCUMENTS

| | | | |
|---|---|---|---|
| 2006/0173663 A1* | 8/2006 | Langheier | G16H 50/20 703/11 |
| 2008/0154821 A1* | 6/2008 | Poulin | G06Q 10/04 706/21 |
| 2009/0083195 A1* | 3/2009 | Aymeloglu | G06Q 10/04 705/36 R |
| 2009/0198641 A1* | 8/2009 | Tortoriello | G06N 7/02 706/52 |
| 2012/0226645 A1* | 9/2012 | O'Rourke | G06Q 40/06 706/46 |
| 2014/0052465 A1* | 2/2014 | Madan | G06F 19/3418 705/2 |

* cited by examiner

Conditional Search — Health Care Database

Health Care Metric/Parameter: Heart Rate Variations (HRV)

Output Category: Prevalence of Heart Attacks

Additional Condition: Male

Time Frame: Present — (Default)

Additional Condition: Age (50-60)

Additional Condition: HRV 1

Display Comparison

Search

Cancel

FIG. 8

SYSTEM AND METHOD FOR USING DATA INCIDENT BASED MODELING AND PREDICTION

PRIORITY CLAIM

This application is a non-provisional of, and claims priority to and the benefit of U.S. Provisional Patent Application No. 62/017,682, filed on Jun. 26, 2014, and U.S. Provisional Patent Application No. 62/091,865, filed on Dec. 15, 2014, both of which are incorporated by reference herein in their entirety.

COPYRIGHT NOTICE

A portion of the disclosure of this patent document contains material that is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

The term "big data" as it is used today is a reference to voluminous and complex data sets as well as the challenges associated with analyzing and processing these large data sets. The notion of "big data" is a relatively recent phenomenon that is in part a result of the reduced costs of storage and in part a result of proliferation of data gathering technologies and techniques in virtually every sector of business and technology. "Big data" may be structured, unstructured, or partially structured and may be distributed across a network.

As a consequence of the vastness and relative loose boundaries of what defines "big data," the possession of "big data" is nonetheless problematic because the data tends to be difficult to parse for the purposes of identifying valuable information embedded therein and extracting that valuable information from the data while distinguishing noise or other misleading information in the data set.

Big data is also problematic because it does not necessarily contain information or knowledge. In other words, given a large data set, it is often difficult to ascertain whether an apparent input and an apparent output are related in any way. Big data can also be noisy and misleading simply due to the vastness of the data set, meaning that it is often difficult to filter noise and misleading data to extract usable knowledge. Such large data sets can also prove to be a barrier for swift decision making given their cumbersome nature. Big data can also contain confirmations of existing knowledge (e.g., that adults are living longer on average in 2014 than they did in 1914) rather than providing new knowledge and models. Finally, given that searching for information in big data sets can be like looking for a needle in a haystack, the value of finding such "needles" may be outweighed by the cost of locating it.

Despite these identified problems, data is fundamentally the only source of knowledge in the world. Humans learn from observing the occurrence of actual events, experimentation, and the like. Most, if not all, scientific fields are based on knowledge obtained from collecting and analyzing data. Even in situations where functions or models are developed to describe a phenomenon, the scientific process usually involves collecting data and fitting a function or model to the data until an adequate degree of accuracy is achieved.

Traditional modeling and machine learning paradigms have proven to be insufficient and ineffective for handling big data. Specifically, traditional modeling paradigms are highly dependent on the erroneous assumption that input-output or functional relationships must exist to extract meaningful knowledge from big data sets. Accordingly, traditional modeling and machine learning paradigms have sought to develop functions or models that describe the relationship between outputs and inputs, with "success" being judged based on how much of the actually observed data is described by the function or model. As such, much of the research related to big data heretofore has been focused on understanding and attempting to derive functions or other easily-expressible input/output relationships based on already-stored data to predict behavior or to otherwise analyze the data set to extract useful relationships.

One problem with this traditional modeling approach is that there may be hidden layers or layers of abstraction to explain why a particular input layer leads to a particular output layer. In a simplified example, a function to describe the time to heat water by a certain number of degrees may be derived from data obtained at sea level, and because of hidden layers (i.e., the impact of thinner atmosphere at higher elevations), the model may be ineffective to describe observed data at mountainous elevations. While these hidden layers are readily seen in this example, they can be much more numerous and difficult to identify in more complex input/output relationships, such as relationships involving the financial industry.

As alluded to above, the traditional approach also typically assumes a functional form for the relationship between inputs and outputs. This functional form is usually assumed to be a linear model, such as ARMA, GARCH, and the like, although in more exotic situations, nonlinear models including logistic models and neural networks are assumed. One problem with this functional assumption is that searched-for functions tend to be time invariant and take the same form at different times. Similarly, these functions tend to be event invariant in that the functions take the same form regardless of underlying events that are occurring. This byproduct of the assumption that relationships are functional fails to take into account that the world is often a discrete, discontinuous entity where time and event changes mean that the outputs corresponding to a set of inputs can be discontinuously changing depending on the time and/or underlying events. In other words, a fixed continuous relationship may not exist in many real-world systems such as in the financial market and economic system. The assumption that functions define the relationship between inputs and outputs and the determination of subsequent models/functions are a necessary tool for small data sets because significant interpolations and extrapolations are necessary with small data. It also works well for a classic physical system where fixed continuous relationships do exist (e.g., a set of 1000 drops of an object from varying heights used to generate the equation Force=mass*acceleration). However, "big data" makes determining a functional description unnecessary because fewer interpolations and extrapolations are necessary. Moreover, observed data samples themselves can be dense enough to represent the input and output relationship as described in this disclosure. Also, for many applications other than simplified physical systems, at best, it proves significantly difficult to find an accurate functional relationship between inputs and outputs, and more often, such simple function relationships just do not exist (e.g., where thousands of different objects from extremely small to extremely large are dropped in different fluids, ranging from air to water to a vacuum, with drag playing a varying role depending on the object and the fluid density).

For the reasons described above, traditional modeling approaches have been most successful in determining physical laws, such as Newton's laws, Kepler's laws of planetary motion, and the like. Given that objects have continuous motion, interpolation and extrapolation can be readily performed without the need for substantial amounts of data. In more complex settings, such as with financial data, it is possible that different functions can describe the same set of data. It is difficult or impossible to determine which function is the "right" function to describe the data.

Moreover, the uncertainty resulting from trying to match a function to a data set in traditional approaches takes a probability function form, such as a normal distribution, making the derived function less useful. In the past this notion has been described as an "error term", whereby the relationship between an input and an output is defined by some function plus some uncertainty random variable, such as a Gaussian random noise. However, the problems discussed above in generating the relationship function are exacerbated by attempting to determine an uncertainty using a random variable with a predefined form of distribution, making traditional approaches even more unwieldy with large sets of data.

Traditional approaches also generally fail to appreciate that the most useful output to users of systems that provide big data analysis capabilities is often a distribution of possible outcomes, as opposed to a single "best" outcome. That is, existing systems seek to define a function or group of functions to calculate a "best" outcome rather than providing a user with a distribution of outcomes that indicates several possible outcomes and a likelihood or incident of each of the possible outcomes. This effort ignores the fact that often a distribution of potential outcomes is useful to users to indicate a series of possible outcomes, along with an indication of how likely the outcome is to occur.

The emphasis on functional or relational forms is the result of the erroneous assumption that there is necessarily a single or a small number of functional relationships between inputs and outputs. Furthermore, with little idea of which function is proper under different circumstances, the traditional modeling of big data produces far too many outliers or exceptions to the rule defined by the function. The system disclosed herein recognizes that this approach may be ill-suited to process "big data" sets that are becoming more and more readily available, and presents a paradigm shift in terms of the way big data analysis is approached.

SUMMARY

The present disclosure addresses the above-described problems inherent in using a traditional functional derivation approach to model big data by providing a paradigm shift in approach. Specifically, the system and methods disclosed herein eschew efforts to define functional relationships between inputs and outputs, opting instead to construct mappings of inputs to outputs in historical data sets and using those mappings to construct conditional distributions of past outcomes, which distributions can be used to analyze the data set and/or predict future events. The disclosed system operations on the basic premise that when enough data is collected, events that actually occurred in the past can be informative as to the likelihood of certain events occurring in the future.

The system disclosed herein recognizes that, in all likelihood, simple functional forms do not exist to describe many of the input/output relationships that people are interested in today. For example, it is highly unlikely that a simple functional form can be determined to describe the behavior of stocks or other financial products in the complex worldwide economy. Likewise, it is highly unlikely that a simple functional form can be determined to describe a person's heartrate patterns preceding a heart attack, or to describe a server's CPU usage pattern preceding a crash. The disclosed system recognizes, however, that modern computing resources provide for massive amounts of affordable memory to store data about events that have occurred in the past, and seeks to use those resources to extract knowledge. The disclosed system also operates on the "big data" assumption that there are enough data points to represent input/output patterns and incident mappings.

The disclosed system also recognizes that the human brain operates as an associative memory; it is effectively a lookup table that draws on past experiences to determine whether, for example, an object perceived by the eyes is human and not an animal.

The disclosed system recognizes that while there are an enormous number of potentially useful events, the number of events useful to a particular class of users is finite and they tend to cluster. Moreover, particularly with regard to potential inputs (e.g., stock price, resting heart rate), there are a finite number of entries that are useful to a class of users. Moreover, those entries cluster (e.g., a stock price will be a number between about one penny and several thousand dollars, but is unlikely to be several million dollars, and a heart rate is unlikely to be near zero beats per minute and unlikely to be several hundred beats per minute) and are sparse and discrete. Because the inputs cluster and are sparse and discrete, the outputs will similarly cluster and will similarly be relatively sparse and discrete (e.g., a stock price is unlikely to increase by several hundred percent in an hour).

In order to provide for the useful user interactions and data analyses described in more detail below, the disclosed system stores a "big data" set including data describing a large number of past events (e.g., stock prices, earnings, and revenues for companies listed in the S&P 500 for the past 50 years). The system generates and stores a plurality of input data incidents (e.g., day-over-day increase in stock price, relatively flat stock price for one week, relatively flat stock price for one month, etc.). For each of these input data incidents, the system determines a set of potential data outputs (e.g., a stock split, a net increase in stock price of >5% over the course of one year, a bankruptcy filing, etc.). For each of the input data incidents, the system analyzes the "big data" and constructs a distribution of output data incidents. Accordingly, as a simplified example, for companies whose stock price is relatively flat for one month, the system may determine that 1% of the time the company filed for bankruptcy within one year, 90% of the time the stock price remained within 5% of the flat price for the entire year, and 9% of the time the company's stock price increased or decreased by more than 5% over the course of the year. This distribution of output data incidents is stored in a mapped relationship with the input data incident for use as described below. The same process is repeated for each input data incident, resulting in a distribution of data output incidents associated with each input data incident. It should be appreciated that in this process, the system does not endeavor to determine why a particular input incident results in a particular output incident; it merely determines distributions indicating the probability of each of a plurality of outcomes that has actually occurred at least once in the past.

Having constructed a plurality of distributions of output data incidents that have occurred in the past for a particular input data incident, the disclosed system provides several useful user operations and interactions. For example, the disclosed system enables easy smoothing of data sets, easy filtering of data sets, and easy prediction of future events. Each will be briefly addressed in turn below.

The disclosed system provides for easy smoothing by enabling the user to indicate a threshold probability of events in which the user is interested. For example, if a particular input data incident has a stored distribution with 10,000 output data incidents based on the analysis of a set of "big data," the user may decide that he or she wishes to smooth the data by eliminating those output data incidents that occur less than, for example, 3% of the time. This may reduce 10,000 output data incidents to a more manageable number of incidents and thus may provide the user with a much more useful output incident distribution. In another words, the smoothing operation can help identify the distribution of this simultaneous output data incident related to an input data incident. And therefore it can help identify a "clean" simultaneous output data incident related to an input data incident.

The disclosed system also provides for a filtering operation using the mappings of input data incidents to output data incidents. Specifically, if a user is interested in determining a set of input data incidents that minimally describes a particular output (e.g., a minimum set of financial data points that can be used to estimate the present value of a company), the system can compare the output distributions for each of the input data incidents pertaining to that company. For output distributions that are similar enough for a pair of input data incidents, it can be determined that additional conditions placed on the more conditional input data distribution do not affect the output data incidents. Accordingly, those conditions can be excluded from a set of data that is the output of the filtering operation.

Finally, and perhaps most importantly, the disclosed system can be used to predict future events based on input and output data incidents in a "big data" set. For example, if a user wishes to attempt to predict the movement of the stock return of Company A in following month based on the past stock return pattern and company financial indicators, the disclosed system can provide the output data incident distribution of the next month, i.e., stock returns of the next month, by searching for all companies that have similar past stock return and financial indicator data incidents, i.e., the input data incident of companies. This output data incident distribution (stock return), which is conditional on the input data incident (past stock return and financial indicator) of Company A, is used to form the predicted stock return distributions of the following month for Company A.

Reversely, the disclosed system can be used to discover past events leading to current data incidents based on input and output data incidents in a "big data" set. For example, if a user wishes to attempt to find out what type of sales patterns (data incidents) lead to a stock price surge, the disclosed system can provide the output data incident distribution of the past sales preceding the input data incident of all companies with a stock price surge pattern. If the distribution indicates that one particular sales event lead to a stock price surge, we discover one source/cause of a data incident (stock price surge incident). This mechanism can also be used to predict an event. For example, if a user wishes to attempt to predict when a publicly traded company will declare bankruptcy, the disclosed system can provide the output data incident distribution for the input data incident of companies that have declared bankruptcy. If the distribution indicates that one particular event (e.g., 18 straight months of decreases in stock price coupled with a decrease in revenue) has occurred prior to the bankruptcy declaration 90% of the time in the past, the system can monitor for that event and display an indication that the bankruptcy is likely to occur when that particular event occurs.

The disclosed system can additionally be used to determine whether certain historical distributions are representative of historical distributions at a different period and/or future distributions. It can also be used to determine whether historical conditional distributions represent conditional distributions for different historical periods or for the future. The system can further be used to ascertain whether the distribution associated with a certain condition or set of conditions is different from a distribution associated with different set of conditions or fewer or no conditions. Finally, if a condition on the input data incident changes the output data distribution from an input data incident without that condition, the system can determine that that condition contains information germane to the output distribution. This enables the system to determine which conditions contain information, which can help users know which conditions are interesting to the user's goals.

Accordingly, the system described in more detail below represents and implements a new modeling paradigm that is particularly applicable given the proliferation of technology enabling "big data" storage and analysis. This new paradigm involves a fixed input and output data incident mapping, created prior to user interaction, to enable users to manipulate and use data in various ways. This new paradigm can be time varying and event/pattern varying in that at different times and for different events, input data patterns or incidents can have different mappings to output data patterns or incidents. Moreover, the disclosed system is advantageous in that it can be a precursor to traditional modeling techniques if consistent functional forms are suggested by the data.

Additional features and advantages of the disclosed system and method are described in, and will be apparent from, the following Detailed Description and the Figures.

BRIEF DESCRIPTION OF THE FIGURES

FIG. 8 is a screen shot of an example interface for enabling a user to search for and compare data sets according to an example embodiment of the present disclosure.

DETAILED DESCRIPTION OF EXAMPLE EMBODIMENTS

Figure 1:
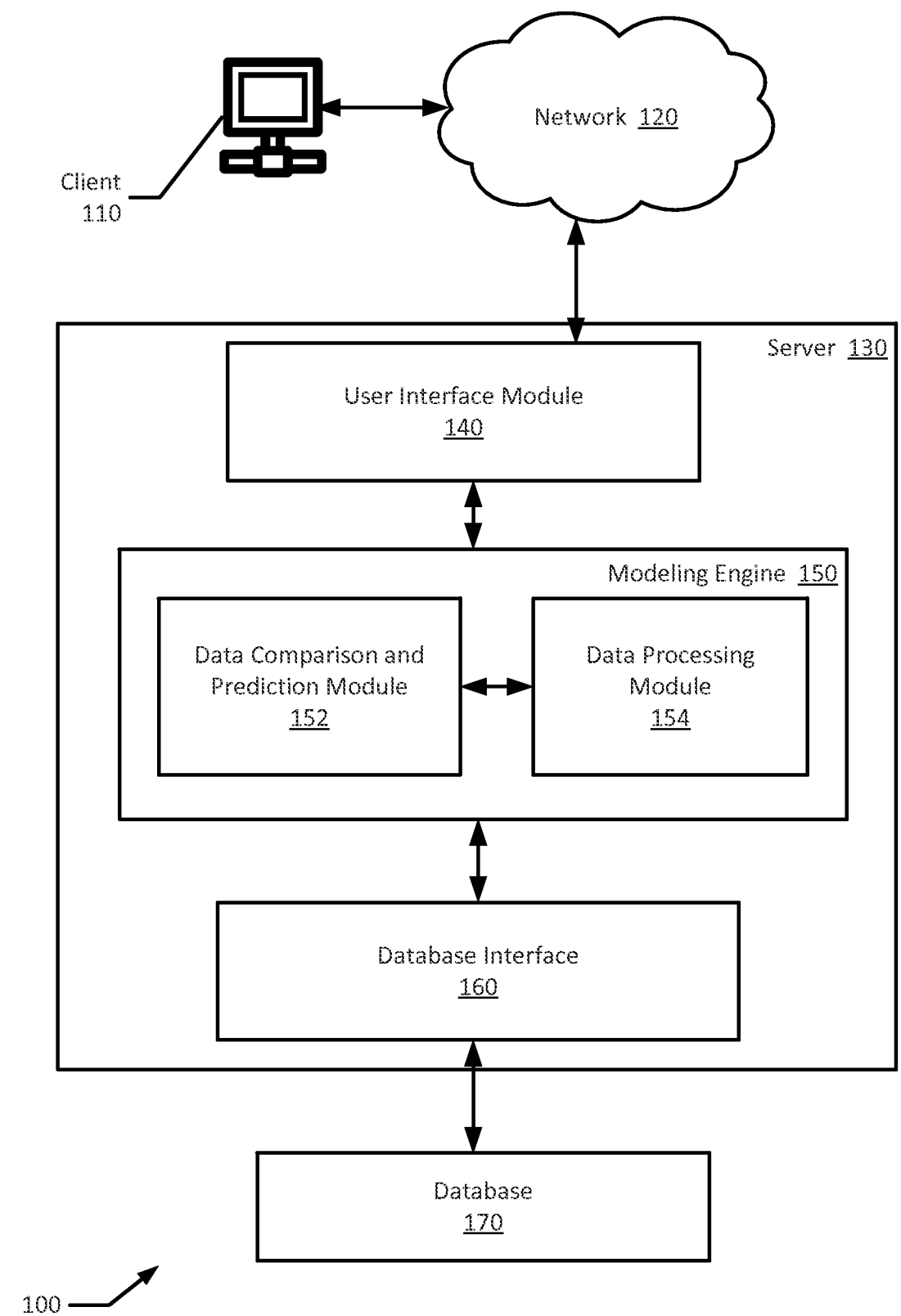
FIG. 1 is a block diagram of an example system including a client, a server, and a database according to an example embodiment of the present disclosure.

The system and methods disclosed herein rely in different capacities on determining and processing big data pertaining to financial objects, health care data, information technology data, and demographic data. It should be appreciated that a "feature" of a financial object, as disclosed herein, includes any set of characteristics of financial data that would be useful to a trader, an underwriter, or any other person using the system. Data contained in a financial database, which may be either time-series data (i.e., data that details the performance of a characteristic of a financial object over time) and textual data (i.e., press releases, news articles, columns, etc.). Similarly, it should be appreciated that health care data, information technology data, and demographics data may include any information that would be beneficial to a user of the system.

It should be appreciated that it is an advantage of the disclosed system and methods to enable a user to define his or her own features, either explicitly or implicitly, as discussed below. However, the system and methods also recognize various features of both time-series data and textual data. Table 1, reproduced below, illustrates an example set of features of data recognizable by the system and methods disclosed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

TABLE 1

| Feature Category | Feature Examples |
| --- | --- |
| Financial Data: Equities such as common stock, preferred stock, exchange traded funds, mutual and closed-end funds, real estate investment trusts, master limited partnerships, royalty trusts, enhanced income securities and other forms of private and public equities in US and non-US markets | Price, volume, bid, ask, trade time, earnings per share, dividend announcement date |
| Financial Data: Options on equities, futures, currencies, and other derivatives contracts, OTC and exchange traded in US and non-US markets | Price, volume, strike price, issue date, expiration date, delta, gamma Black-Scholes model parameters |
| Financial Data: Fixed income securities | Face value, market price, volume, nominal interest rate, market yield, conversion option, date of issue, maturity date, accrued interest, sinking fund, debt covenants |
| Financial Data: Futures and forwards contracts such as commodities futures, interest rate futures, equity index futures, single stock futures | Price, volume, bid, ask, delivery date, margin requirements |
| Financial Data: Quantified credit ratings | S&P investment grade AAA, S&P non-investment grade BB, Moody's investment grade AAA, Moody's speculative grade Ba1 |
| Financial Data: Asset pricing model parameters | Alpha, beta, Sharpe ratio, Fama-French model factors |
| Financial Data: GAAP accounting line items | Revenue, cost of goods sold, selling, general and administrative expenses, depreciation, amortization, interest income, interest expense, net income, extraordinary items, cumulative effect of accounting changes, cash and cash equivalents, short term investments, accounts receivable, property, plant and equipment, accounts payable, short term debt, long term debt, common stock, additional paid-in-capital, shareholder's equity |
| Financial Data: Non-GAAP accounting measures | EBITDA, free cash flow, overhead |
| Financial Data: Valuation metrics | Enterprise value, liquidation value, return on assets, return on equity, return on debt |

TABLE 1-continued

| Feature Category | Feature Examples |
|---|---|
| Financial Data: Projected and historical pro forma financial statement items | |
| Financial Data: Items in accounting disclosures | |
| Financial Data: Information disclosed in SEC Form-10K, Form 10-Q, Form S-1, proxy statements, and other public and private company disclosures | Net operating loss carry forwards, federal state and local taxes in financial statement footnotes, contingencies and commitments described in management discussion and analysis |
| Financial Data: Profitability measures | Rate of return on assets, internal rate of return |
| Financial Data: Capital structure | Number and value of shares, options, warrants, preferred stock, market capitalization, value of debt outstanding |
| Financial Data: Operational variables | Number of customers, number of store closings, same store sales, sales per square foot, churn rate |
| Financial Data: Debt covenants | Coverage ratio requirements, bad boy clauses |
| Financial Data: Technical analysis measures | Elliot wave patterns, head and shoulder formations |
| Financial Data: Macro economic variables | GDP, federal funds rate, unemployment rate, inflation rate, foreign exchange rates, yield curve |
| Financial Data: Audit report items | |
| Financial Data: Analyst estimates | |
| Financial Data: Research report items | Price targets, research firms providing coverage, buy-hold-sell ratings, corporate takeover defense structure |
| Financial Data: Commitment of Traders Report data | Commercial open interests, non-commercial open interests, non-reportable positions, number of traders |
| Health Care Data: Patient data monitoring | |
| Health Care Data: Hospital Microbiome Testing | |
| Health Care Data: Accountable Care Organizations | Provider network optimization |
| Health Care Data: Insurance Providers | Claims data auditing, formulary optimization |
| Information Technology Data | Server infrastructure (CPU utilization, File system available space, disk utilization, etc.), client/user data |
| Demographics Data | Population statistics (height, weight, age, income, employment, productivity, densities, etc.), Election statistics, traffic statistics (patterns, incident of accidents, commute times, etc.), crime statistics, weather and natural disaster statistics, |

It should be appreciated that the feature categories and feature examples included in Table 1 are provided by way of example only. For example, the instant disclosure contemplates GAAP and non-GAAP accounting line items known to financial professionals but not included in Table 1. In additional to the exemplary features in Table 1, the system and methods disclosed may perform processing operations to data containing features that are derivative features of those features disclosed in Table 1. Moreover, the system and methods disclosed may perform processing operations to data containing features that are generated by comparing two or more features with one another to result in a new feature.

Further features categories and implementations of financial and other data sets as understood by one of ordinary skill in the art can be found in U.S. Pat. No. 8,458,065 to Zhang et al. and U.S. Pat. No. 8,930,247 to Zhang et al. which are incorporated herein by reference.

Textual data may include features defined by keywords and generated as discussed below. A non-exhaustive list of key words which may in different embodiments define features of textual data follows: stock ticker symbols; company names; "gross domestic product;" "GDP;" "earnings;" "Chief Executive Officer;" "CEO;" analyst names; potential merger candidates; names of board members; institutional ownership; rosters of insiders; rosters of major holders; words indicating merger and acquisition activity (e.g., "carve out," "spinoff," or "338 tax election"); names of members of management of competitor firms; and any keywords illustrative of one of the time-series data features included in Table 1 above. It should be appreciated that features of textual data may be derived from the above list of features, or may be created by comparing two or more existing features.

FIG. 1 depicts a high-level component diagram of an example multi-processor computer system 100 in accordance with one or more aspects of the present disclosure. In an example embodiment, the components on computer system 100 may operate on one or more physical processors communicatively coupled to memory devices and input/output devices. For example, a client computer terminal 110 (otherwise referenced herein as "terminal 110") may be a personal computing device, server, etc. In another example embodiment, a terminal 110 may be a virtual machine or application executing on a personal computing device, server, the one or more physical processors, etc.

As used herein, a physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device or memory refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data.

In an example embodiment, a user may access the system described by way of a terminal 110. Terminal 110 enables the user to interact with computer server 130 (otherwise referenced herein as "server 130") and indexed or non-indexed database 170 (otherwise referenced herein as "database 170") via network 120. For example, the network 120 may be a public network (e.g., the Internet), a private network (e.g., a local area network (LAN) or wide area network (WAN)), an enterprise service bus (ESB), or a combination thereof.

In an example embodiment, terminal 110 interacts directly with the user interface (UI) module 140. The UI module 140 may reside on a local machine, connected to the terminal 110 by a local network connection. Alternatively, the UI module 140 may reside on a web server such that the terminal 110 interacts with the UI module 140 by way of network 120. A user at terminal 110 provides requests or commands to the server 130 by way of the terminal 110 as enabled by the UI module 140.

The functionality of each module of server 130 is discussed in greater detail below. In an example embodiment, the modeling engine 150 includes a data comparison and prediction module (DCPM) 152 and a data processing module (DPM) 154. In an example embodiment, the DCPM 152 compares data sets or distributions and performs analysis and prediction in accordance with the present disclosure as described in greater detail below. As used herein, data sets refer to a group (or set) of information or data incidents. As used herein, distributions are a property of data sets. However, the modeling engine 150 of the present disclosure may compare and perform analysis and prediction using either data sets generally, or distributions. The DPM 154 performs the searches, retrievals, construction of data sets, and other data processing operations as discussed in greater detail below. In an example embodiment, the modeling engine 150 may operate using a smaller number of modules or a greater number of modules to perform the various operations described herein.

As discussed above, database 170 may contain a variety of data including financial data, information technology data, health care data, demographic data, etc., or data sets derived from the above-noted data sets. In an example embodiment, database 170 may be in a single location or may be distributed across a network. In an example embodiment, database 170 may be a flat or non-indexed database, or may be an indexed database. Database 170 may also include historical data from a multitude of time periods. Furthermore, the database 170 may include a source of real-time data that enables a user to interface with presently available information.

In an example embodiment, server 130 and database 170 may operate using a database management system (DBMS). Data may be physically stored in database 170 according to a file system, and the DBMS may be a software application that facilitates interaction between database 170 and other components in system 100. The DBMS may reside on database 170 or on server 130. For example, the DBMS may have an associated data definition language describing commands that may be executed to interact with the database. Examples of suitable DBMS's include MySQL, MariaDB, SQLite, PostgreSQL, Microsoft SQL Server, various DBMS's available from Oracle Corporation, various DBMS's available from SAP AG, etc.

The database 170 may be logically organized according to a database schema. For example, the database schema may describe logical relationships between data items of the database in terms of related database objects such as, tables, indices, etc. Tables and other database objects logically described by the schema may be physically stored in database 170 in any suitable manner. For example, the DBMS may utilize a file system to store the data items making up the database. Any suitable file system may be used including, for example, Global File System (GFS), File Allocation Table 16 (FAT16), File Allocation Table 32 (FAT32), NTFS, High Performance File System (HPFS), or any UNIX or Linux file system. Alternatively, in another example embodiment, the database 170 may not be indexed or organized according to any schema.

In an example embodiment, database interface 160 may operate using a DBMS to convert a message from the modeling engine 150 into database queries of the appropriate format to interact with the database 170, and sends the queries to the appropriate database 170. The database 170 may then satisfy the queries sent by the database interface 160 and provide the queried information to the database interface 160. The database interface 160 then forwards the queried information to the modeling engine 150. If further processing is required, the modeling engine 150 processes the data received from the database interface 160 as described in greater detail below.

Alternatively, if no further processing of the information received by the modeling engine 150 from the database interface 160 is necessary, the modeling engine 150 may send the information directly to the UI module 140 for viewing by the user at terminal 110. The information returned to the user accessing the server 130 by way of the terminal 110 may include one or more of search results, retrieval of financial, health care, information technology, or demographic information, analysis or predictions performed by the server 130, results of processing performed by the server 130, or advice or suggested decisions generated by the server 130. In an example embodiment, server 130 may interface with multiple databases via a network. In an example embodiment, the database interface 160 is configured to interact with an external database 170 in a suitable way, depending on the implementation and the interface requirements of the database 170.

Figure 2:
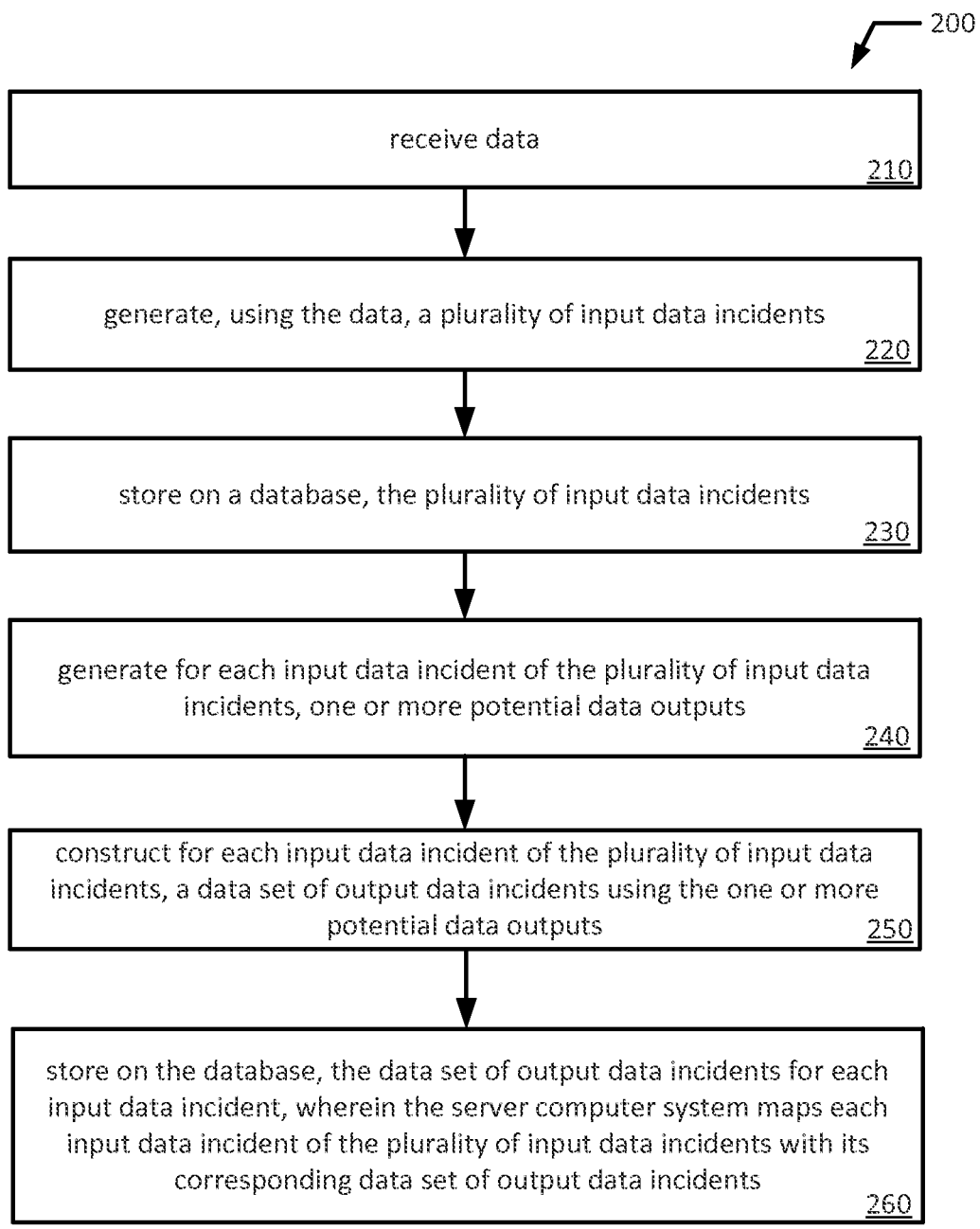
FIG. 2 is a flow chart illustrating an example process for generating an intelligent dataset mapping input data incidents and output data incidents on a database according to an example embodiment of the present disclosure.

FIG. 2 illustrates a flowchart of an example method 200 for generating an intelligent dataset mapping input data incidents and output data incidents on a database according to an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 starts and a server computer system (or server) 130 receives data (block 210). In an example embodiment, this data is a large data set (e.g., "big data"). The server 130 generates using the data, a plurality of input data incidents (block 220). In an example embodiment, input data incidents may include any data potentially of interest to a user. For example, input data incidents may include any one or more of the example "features" of the feature categories as described above in Table 1 and the corresponding description. In an example embodiment, generating the plurality of input data incidents includes identifying features of interest (e.g., day-over-day increase in stock price, relatively flat stock price for one week, relatively flat stock price for one month, etc.) in the received data (e.g., stock prices, earnings, revenues for financial data, etc.) and categorizing the received data in accordance with one or more of the features of interest. The server 130, stores the plurality of input data incidents on a database 170 (block 230).

The server 130 then generates, for each input data incident of the plurality of input data incidents, one or more potential data outputs (block 240). The potential data outputs may be any one of the feature categories described in Table 1 and the corresponding description. For example, server 130 may determine that a stock split, a net increase in stock price of >5% over the course of one year, and a bankruptcy filing are among the feature categories potentially of interest to an individual. In an example embodiment, a user of server computer system 130 may send the server 130 particular input data incidents and potential data outputs of interest to the user and the server may generate the plurality of input data incidents and/or the one or more potential data outputs based on this received user input.

The server 130 then constructs, for each input data incident of the plurality of input data incidents, a data set of output data incidents using the one or more potential data outputs (block 250). In an example embodiment, the server 130 constructs the date set of output data incidents by identifying and categorizing any of the received data that corresponds to one of the potential data outputs. The server 130 maps each input data incident of the plurality of input data incidents with its corresponding constructed date set of output data incidents and stores this mapping along with the date set of output data incidents on the database 170 (block 260). For example the server 130 may identify and categorize all the incidents of stock splits (a potential data output) in the received data set and then map each one of these date sets of output data incidents with a day-over-day increase in stock price (an input data incident) where data indicative of such a correlation is present in the database 170. This date set of output data incidents and the mapping are stored in database 170. Accordingly, in this simplified example, the database 170 would contain information about any correlations between incidents of day-over day increases in stock price and the incidents of stock splits. It should be appreciated that in some instances, certain features may be both inputs (in the sense that correlated output data is determined) and outputs (in the sense that they correlate to other input data set features).

Figure 3:
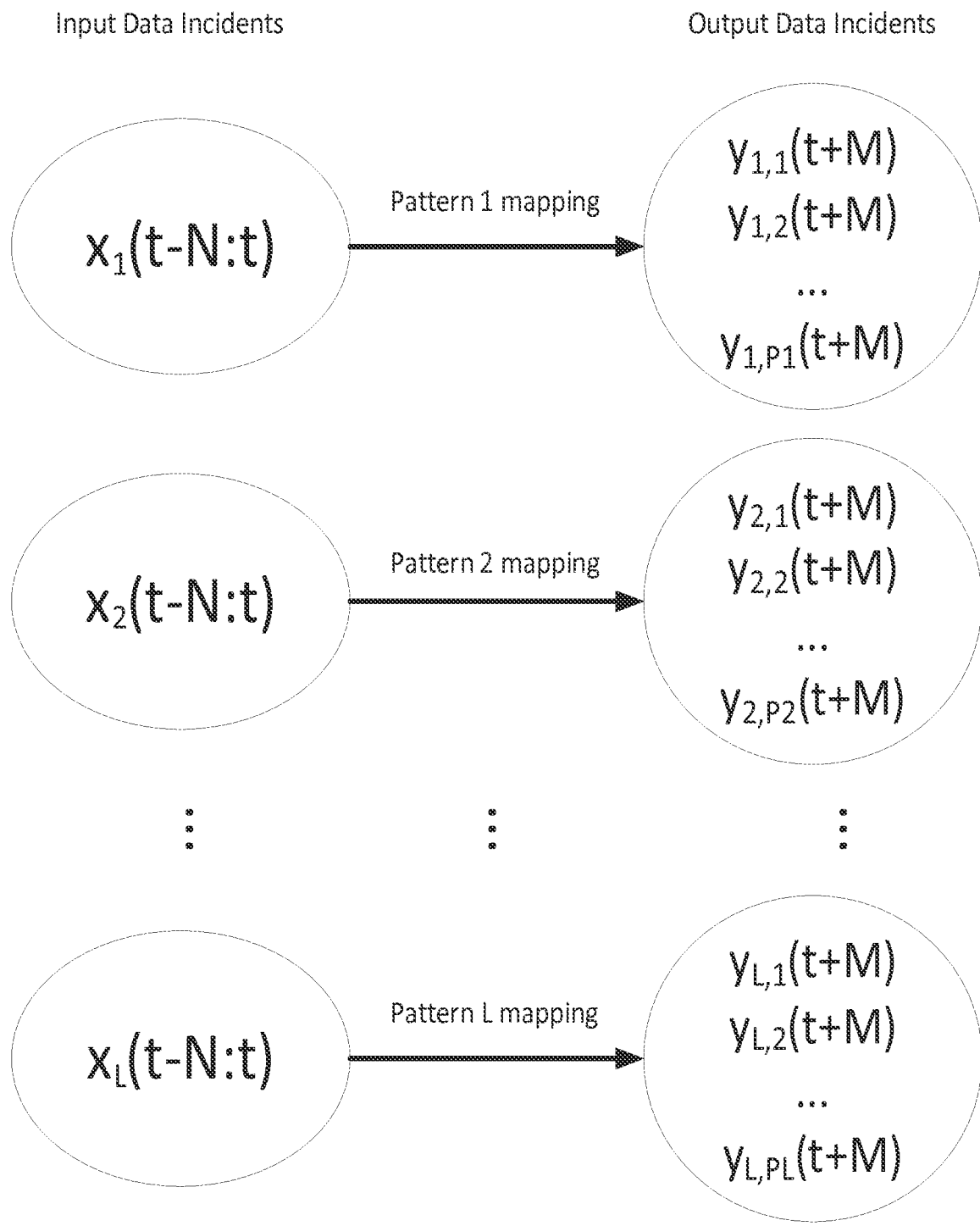
FIG. 3 is a block diagram illustrating mappings between input data incidents and output data incidents according to an example embodiment of the present disclosure.

FIG. 3 depicts a block diagram illustrating mappings between input data incidents and output data incidents according to an example embodiment of the present disclosure. As illustrated, the system of the present disclosure uses pattern mapping to link each set of input data incidents or search conditions (e.g., $x_1(t-N:t)$) with a date set of output data incidents (e.g., $y_{1,1}(t+M)$, $y_{1,2}(t+M)$, $y_{1,p1}(t+M)$, etc.). The server 130 performs this mapping without assuming or needing to determine functional relationships between input data incidents and output data incidents. Indeed, according to the theory underlying the instant disclosure, whether or not such functional relationships exist is immaterial; the determined mapping indicates what has actually happened with regard to data stored in the data set. The server 130 simply associates or correlates the input and output data without defining a functional relationship between the data. In an example embodiment, the server 130 maps each input data incident of the plurality of input data incidents with its corresponding data set of output data incidents by testing the significance of the difference among the output data sets for different input data incidents. For example, the server may map a particular input data incident with a date set of output data incidents responsive to determining that the probability of an output data incident following an input data incident is different from the probability of an output data incident occurring in isolation (e.g., $P(Y|\text{incident } x) \sim P(Y)$), i.e., the input data incident contain additional information of the output data incidents.

In an example embodiment, the server may map a particular input data incident with a distribution of output data incidents responsive to determining that certain classifications between input data incidents and output data incidents are applicable such as mean reversion, momentum, and other classical technical patterns as input data incidents (i.e., search conditions).

In this manner, the system of the present disclosure (e.g., server 130) is able to capture relationships in database 170 that are time varying and event/pattern varying in that at different times and for different events, input data patterns or incidents can have different mappings to output data patterns or incidents. The server 130 also maps any output uncertainty and probability distributions for the input data incidents and output data incidents in database 170. Moreover, having constructed in a database 170 a plurality of date sets of output data incidents that have occurred in the past for a particular input data incident, the disclosed system provides several useful user operations and interactions. For example, the disclosed system enables easy smoothing of data sets, easy filtering of data sets, and easy prediction of future events. These are described in greater detail with respect to FIG. 4 below.

Figure 4:
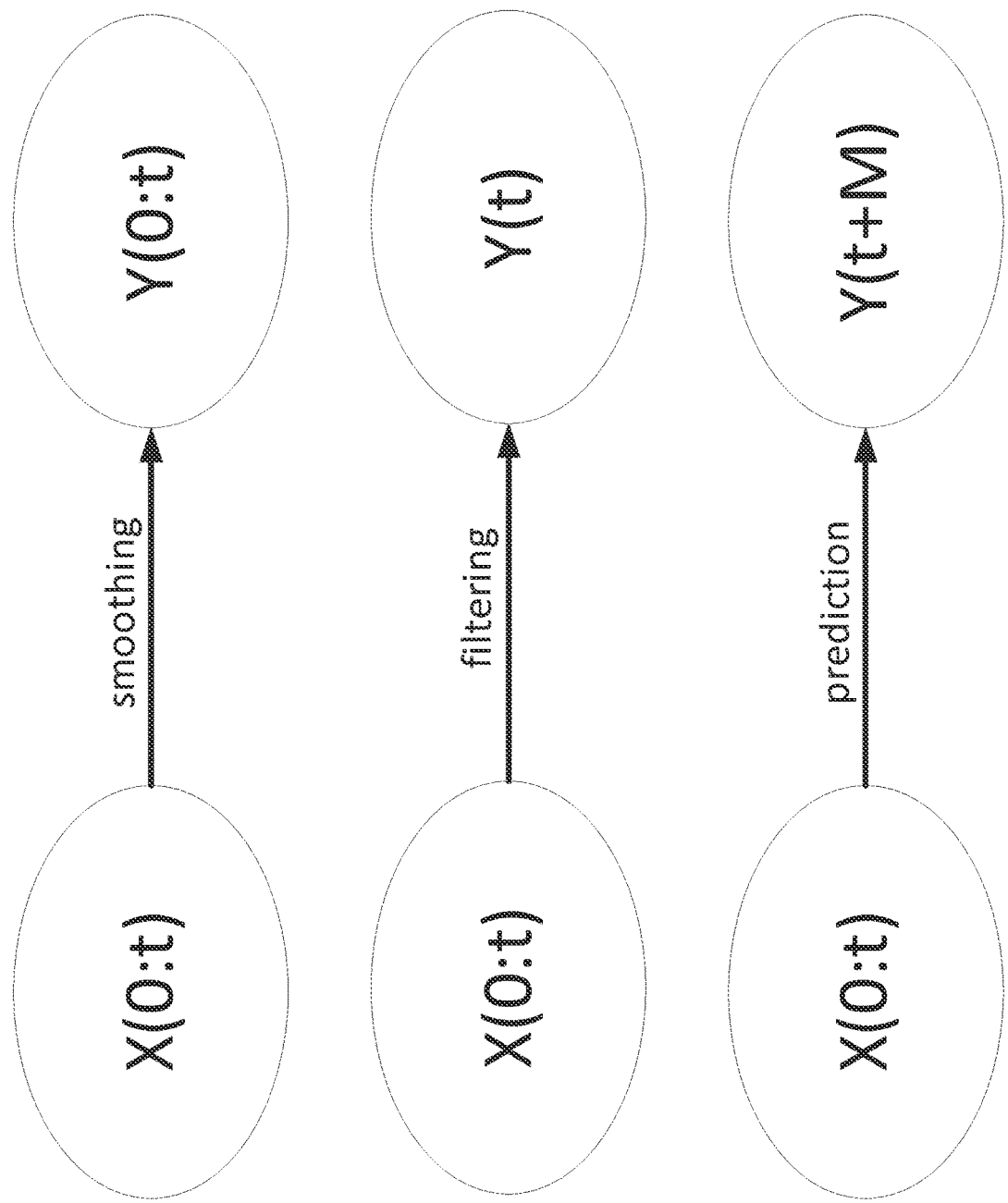
FIG. 4 is a block diagram illustrating smoothing, filtering, and prediction operations according to an example embodiment of the present disclosure.

FIG. 4 is a block diagram illustrating smoothing, filtering, and prediction operations according to an example embodiment of the present disclosure. In an example embodiment, the server 130 smooths mapped data stored in a database 170 by (a) receiving, from a user, a threshold probability and (b) responsive to receiving the threshold probability, removing those output data incidents (and/or mappings between those output data incidents and input data incidents) from the database 170 that do not satisfy the threshold probability. In an example embodiment, the threshold probability indicates either a percentage of occurrence or a frequency of output data incidents below which a user is not interested in particular data. For example, if a particular input data incident has a stored date set with 10,000 output data incidents based on the analysis of a set of "big data," the user may decide that he or she wishes to smooth the data by eliminating those output data incidents that occur less than, for example, 3% of the time. This may reduce 10,000 output data incidents to a more manageable number of incidents and thus may provide the user with a much more useful output incident distribution. In another words, the smoothing operation can help identify the distribution of this simultaneous output data incident related to an input data incident. And therefore it can help identify a "clean" simultaneous output data incident related to an input data incident.

In an example embodiment, the server 130 filters mapped data stored in a database 170 by (a) receiving, from a user, a threshold level of correlation, (b) comparing, by the server 130, output data incidents for each input data incident to determine a level of correlation between the output data incidents and the input data incident, and (c) removing those output data incidents (and/or mappings between those output data incidents and input data incidents) from the database 170 for which the level of correlation does not exceed the threshold level of correlation. For example, if a user is interested in determining a set of input data incidents that minimally describes a particular output (e.g., a minimum set of financial data points that can be used to estimate the present value of a company), the system can compare the output date sets for each of the input data incidents pertaining to that company. For output date sets that are similar enough for a pair of input data incidents, it can be determined that additional conditions placed on the more conditional input data incidents do not affect the output data incidents. Accordingly, those conditions can be excluded from a set of data that is the output of the filtering operation. In this manner, the output data incidents are also excluded from the set of data in the database 170.

In an example embodiment, the server 130 can predict future events using input and output data incidents in the database 170. For example, the server 130 can (a) receive, from a user, a period of time for which the user seeks information, one or more input data incidents, and a data output of interest to the user, (b) the server 130 identifies similar output data incidents corresponding to the received data output of interest and identifies similar input data incidents corresponding to the one or more received input data incidents, (c) the server 130 then searches for all similar output data incidents (for the data output of interest) that correspond to similar input data incidents, and (d) the server 130 provides to the user a predicted distribution of output data incidents for the period of time based on the search results for the similar output data incidents. For example, if a user wishes to attempt to predict the movement of the stock return of Company A in a following month based on the past stock return pattern and company financial indicators, the disclosed system can provide the distribution of the data set of the output data incident of the next month, i.e., stock returns of the next month, by searching for all companies that have similar past stock return and financial indicator data incidents, i.e., the input data incident of companies. This output data incident distribution (stock return), which is conditional on the input data incident (past stock return and financial indicator) of Company A, is used to form the predicted stock return distributions of the following month for Company A.

Figure 5:
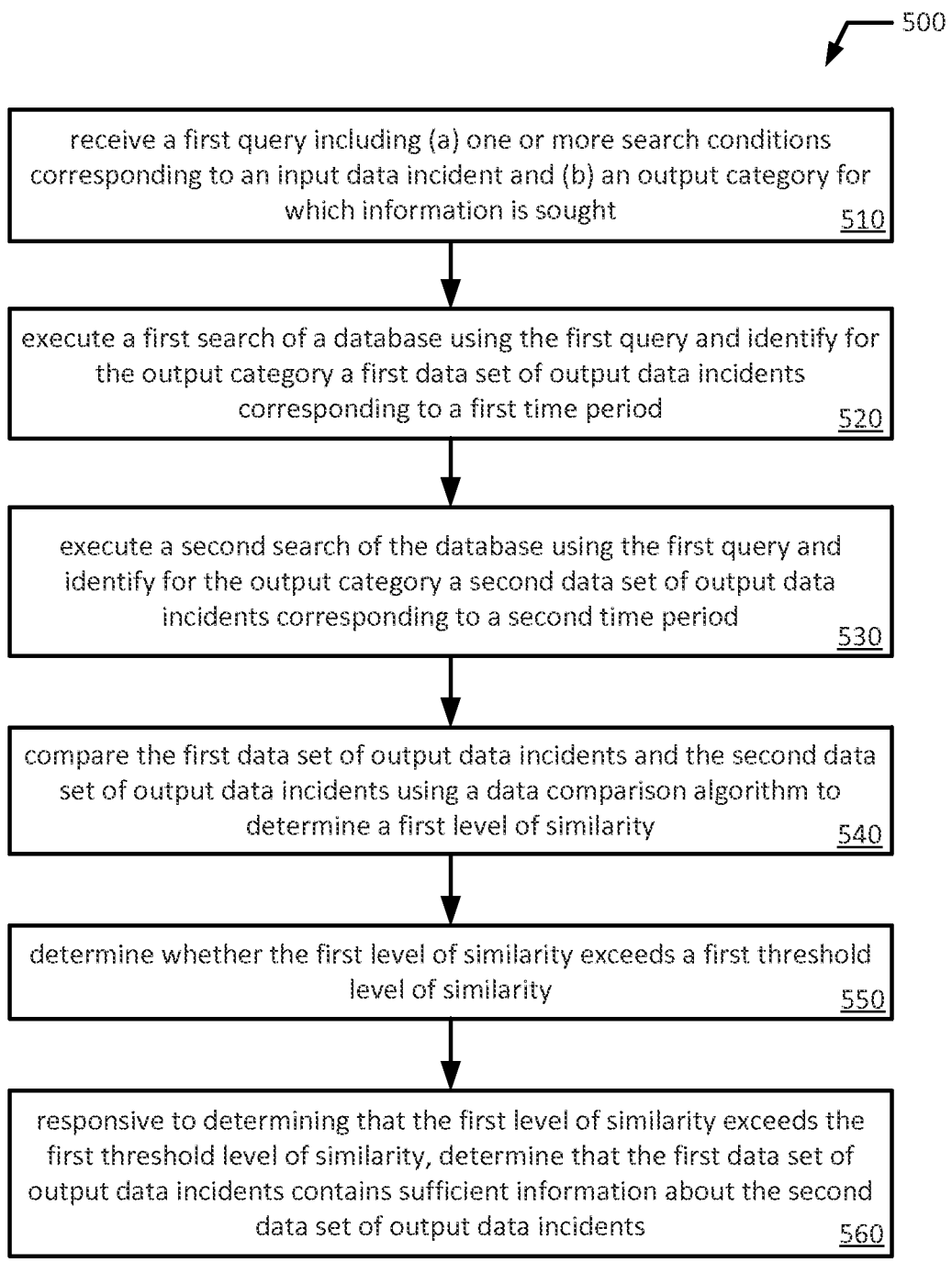
FIG. 5 is a flow chart illustrating an example process for determining whether a first data set contains sufficient information about a second data set according to an example embodiment of the present disclosure.

FIG. 5 is a flow chart illustrating an example process for determining whether a first data set contains sufficient information about a second data set according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

Figure 11:
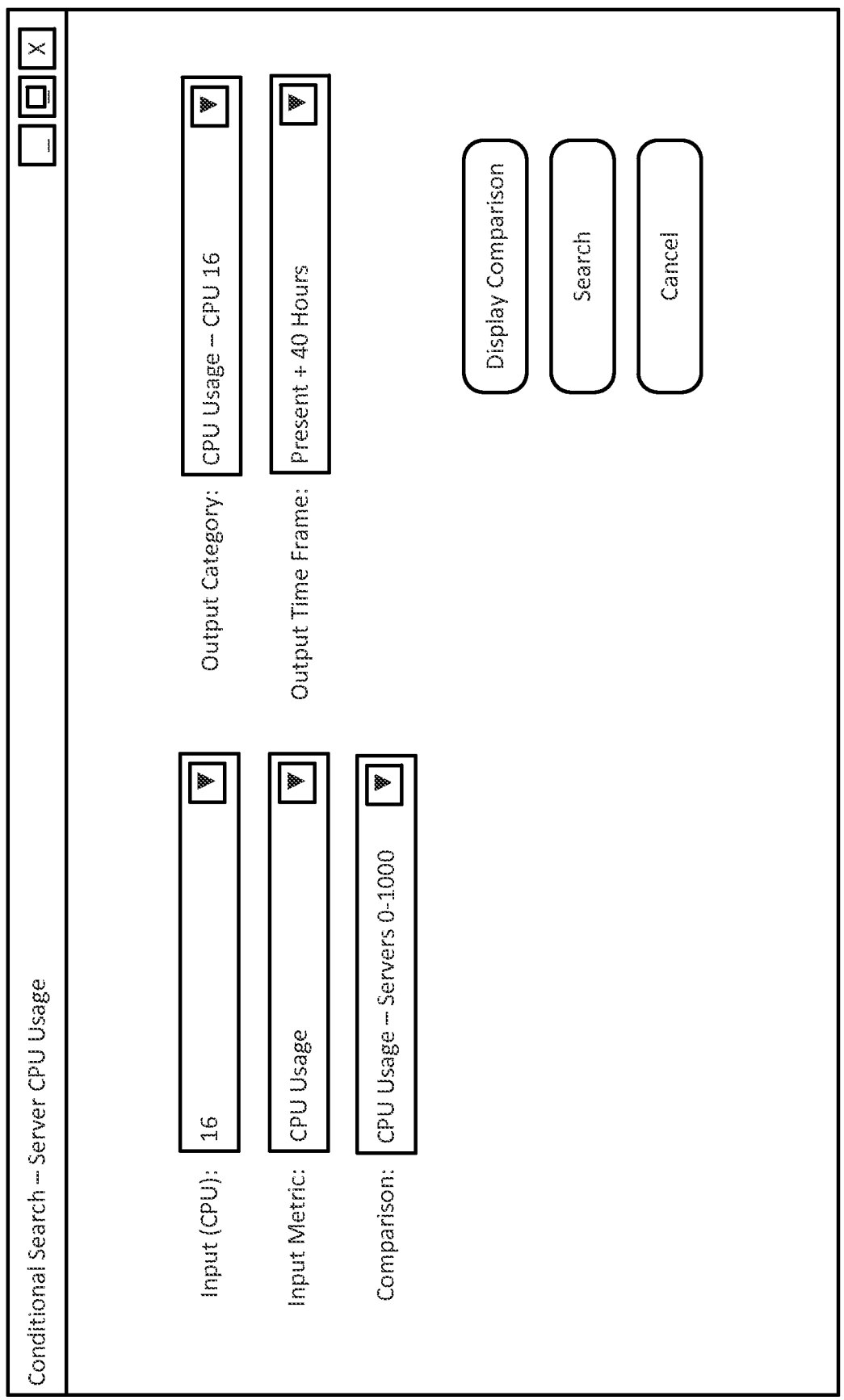
FIG. 11 is a screen shot of an example interface for enabling a user to search for and compare data sets according to an example embodiment of the present disclosure.

The example method 500 starts and the modeling engine 150 receives a first query including (a) one or more search conditions corresponding to an input data incident and (b) an output category for which information is sought (block 510). In an example embodiment, the modeling engine 150 via the user interface module 140 may provide a client 110 with an interface to enter one or more terms, that are received by the modeling engine 150 as the one or more search conditions corresponding to an input data incident or the one or more output categories for which information is sought. In another example embodiment, the modeling engine 150 via the user interface module 140 may provide a client 110 with an interface and one or more options from which to select, that are received by the modeling engine 150 as the one or more search conditions corresponding to an input data incident or the one or more output categories for which information is sought. Examples of such interfaces are illustrated in FIGS. 8 and 11 and described further with reference to these figures.

The modeling engine 150 then executes a first search of the database 170 using the first query and identifies for the output category a first data set of output data incidents corresponding to a first time period (block 520). In an example embodiment, the first data set of output data incidents is displayed to a user or client 110. The modeling engine 150 executes a second search of the database 170 using the first query and identifies for the output category a second data set of output data incidents corresponding to a second time period (block 530). In an example embodiment, the second data set of output data incidents is displayed to a user or client 110. In an example embodiment, the first period of time is prior to the second period of time. Accordingly, the first data set of output data incidents may be used to predict outcomes regarding the second data set of output data incidents. In an example embodiment, the first period of time is subsequent to the second period of time. Accordingly, the first data set of output data incidents may be used to identify causes or precursors to the second data set of output data incidents. In an example embodiment, the first and second data sets of output data incidents do not correspond to time periods.

The modeling engine 150 compares the first data set of output data incidents and the second data set of output data incidents using a data comparison algorithm to determine a first level of similarity between the first and second data sets of output data incidents (block 540). In an example embodiment, the data comparison algorithm is an empirical probability distribution comparison algorithm. In an example embodiment, an empirical probability distribution comparison algorithm may be a path matching algorithm in which the distribution paths of different data sets are compared based on at least one of: a number of path matches, a mean value, a standard deviation, a skew, a kurtosis, a KS test statistics, a T test statistics, a weighted Euclidean distance measure, a weighted correlation measure, a KL divergence measure, a mutual information measure, and a chi-square test statistics.

The modeling engine then determines whether the first level of similarity exceeds a first threshold level of similarity (block 550). As used herein, a threshold level of similarity may be selected by a user or client 110 or selected by the modeling engine 150. In an example embodiment, the first and second data sets of output data incidents and the first level of similarity are displayed to a user or client 110. Responsive to determining that the first level of similarity exceeds the first threshold level of similarity, the modeling engine 150 determines that the first data set of output data incidents contains sufficient information about the second data set of output data incidents (block 560). In an example embodiment, responsive to determining that the first data set of output data incidents contains sufficient information about the second data set of output data incidents, the modeling engine 150 may indicate this to the user or client 110 (via the user interface module 140). In this way, a user can perform further analysis of the first and second data sets of output data incidents and conduct additional searches of the database 170.

In an example embodiment, the modeling engine 150 may repeat the steps described in blocks 520, 530, 540, 550, and 560 using the first query to identify additional data sets of output data incidents that are similar to the second data set of output data incidents. In this manner the modeling engine 150 identifies one or more data sets of output data incidents with the highest level of similarity to the second data set of output data incidents. In an example embodiment, the modeling engine 150 may repeat the steps described in blocks 520, 530, 540, 550, and 560 using the first query to identify new sets of data sets of output data incidents to compare for similarity. For example, the modeling engine 150 may repeat these steps responsive to an indication by the user or client 110 that the first and second data sets of output data incidents do not contain information of interest to the user. In an example embodiment, the modeling engine 150 may repeat the steps described in blocks 520, 530, 540, 550, and 560 to search for and compare subsets of the first and second data set of output data incidents using the first query. In this manner, the modeling engine 150 can further target potential distributions of output data incidents that may contain useful information for a user. For example, the modeling engine 150 may repeat the steps described in blocks 520, 530, 540, 550, and 560 to identify a third and fourth data set of output data incidents within the second data set of output data incidents and compare the third and fourth data set of output data incidents to determine a level of similarity. The modeling engine 150 may then determine if this level of similarity between the third and fourth data sets of output data incidents exceeds a threshold level of similarity and determine whether or not the third data set of output data incidents contains sufficient information about the fourth data set of output data incidents.

In an example embodiment, responsive to determining that the first data set of output data incidents contains sufficient information about the second data set of output data incidents, the modeling engine 150 constructs for the output category, a third data set of output data incidents corresponding to a third time period, wherein the third data set of output data incidents is extrapolated from at least one of the first data set of output data incidents and the second data set of output data incidents. Then, responsive to constructing the third data set of output data incidents, the modeling engine 150 displays a visual representation of the third data set of output data incidents to the user or client 110. In an example embodiment, the third time period is some time in the future and the first and/or second data set of output data incidents are used to predict the third data set of output data incidents. In an example embodiment, the third time period is some time in the past and the first and/or second data set of output data incidents are used to identify a precursor third data set of output data incidents. In an example embodiment, extrapolation includes aggregating one or more data points.

In an example embodiment, displaying a visual representation of the third data set of output data incidents set includes the modeling engine 150 displaying a most likely potential output data incident or an empirical probability distribution of the data set of output data incidents. For example, the modeling engine may first determine an outcome that occurs most often in the third data set of output data incidents and then display an indicator that this outcome is the most likely potential output data incident. In an example embodiment, responsive to determining that the first data set of output data incidents contains sufficient information about the second data set of output data incidents, the modeling engine 150 further determines a confidence level based on the first level of similarity. The modeling engine 150 may then display this confidence level to the user or client 110 via the user interface module 140. In this manner, the user can evaluate the confidence with which the system of the present disclosure estimates the third data set of output data incidents.

In an example embodiment, responsive to determining that the first level of similarity does not exceed the first threshold level of similarity, the modeling engine 150 may determine that the first data set of output data incidents does not contain sufficient information about the second data set of output data incidents. In an example embodiment, responsive to determining that the first data set of output data incidents does not contain sufficient information about the second data set of output data incidents, the modeling engine 150 may indicate this to the user or client 110 (via the user interface module 140). In this way, a user can elect perform a different search or add/remove search conditions from the first query.

For example, responsive to determining that the first data set of output data incidents does not contain sufficient information about the second data set of output data incidents, the modeling engine 150 may execute a third search of the database using the first query and identify for the output category a third data set of output data incidents corresponding to a third time period. In an example embodiment, the modeling engine 150 may execute the third search using a new query received from a user or client 110. The modeling engine 150 may then compare the third data set of output data incidents and the second data set of output data incidents using a data comparison algorithm to determine a second level of similarity and determine whether the second level of similarity exceeds a second threshold level of similarity. In an example embodiment, the second threshold level of similarity is different from the first threshold level of similarity. Then, responsive to determining that the second level of similarity exceeds the second threshold level of similarity, the modeling engine 150 may determine that the third data set of output data incidents contains sufficient information about the second data set of output data incidents. In this manner, if the first data set of output data incidents does not contain useful information about the second data set of output data incidents from which to extrapolate information, the system of the present disclosure may attempt to identify other data sets that contain information about a data set of interest.

In another example embodiment, if the first data set does not contain useful or sufficient information about the second distribution, the modeling engine may discard the first and second data sets of output data incidents altogether and analyze new sets of distributions. For example, responsive to determining that the first data set of output data incidents does not contain sufficient information about the second data set of output data incidents, the modeling engine 150 may execute a third search of the database using the first query and identify for the output category a third data set of output data incidents corresponding to a third time period. The modeling engine 150 may further execute a fourth search of the database using the first query and identify for the output category a fourth data set of output data incidents corresponding to a fourth time period. In an example embodiment the searches are executed using a new query received by the user or client 110. The modeling engine 150 may then compare the third data set of output data incidents and the fourth data set of output data incidents using a data comparison algorithm to determine a second level of similarity and determine whether the second level of similarity exceeds a second threshold level of similarity. In an example embodiment, the second threshold level of similarity is different from the first threshold level of similarity. Then, responsive to determining that the second level of similarity exceeds the second threshold level of similarity, the modeling engine 150 may determine that the third data set of output data incidents contains sufficient information about the fourth data set of output data incidents. In an example embodiment, the third and fourth data sets of output data incidents are subsets of the second data set of output data incidents.

Figure 6:
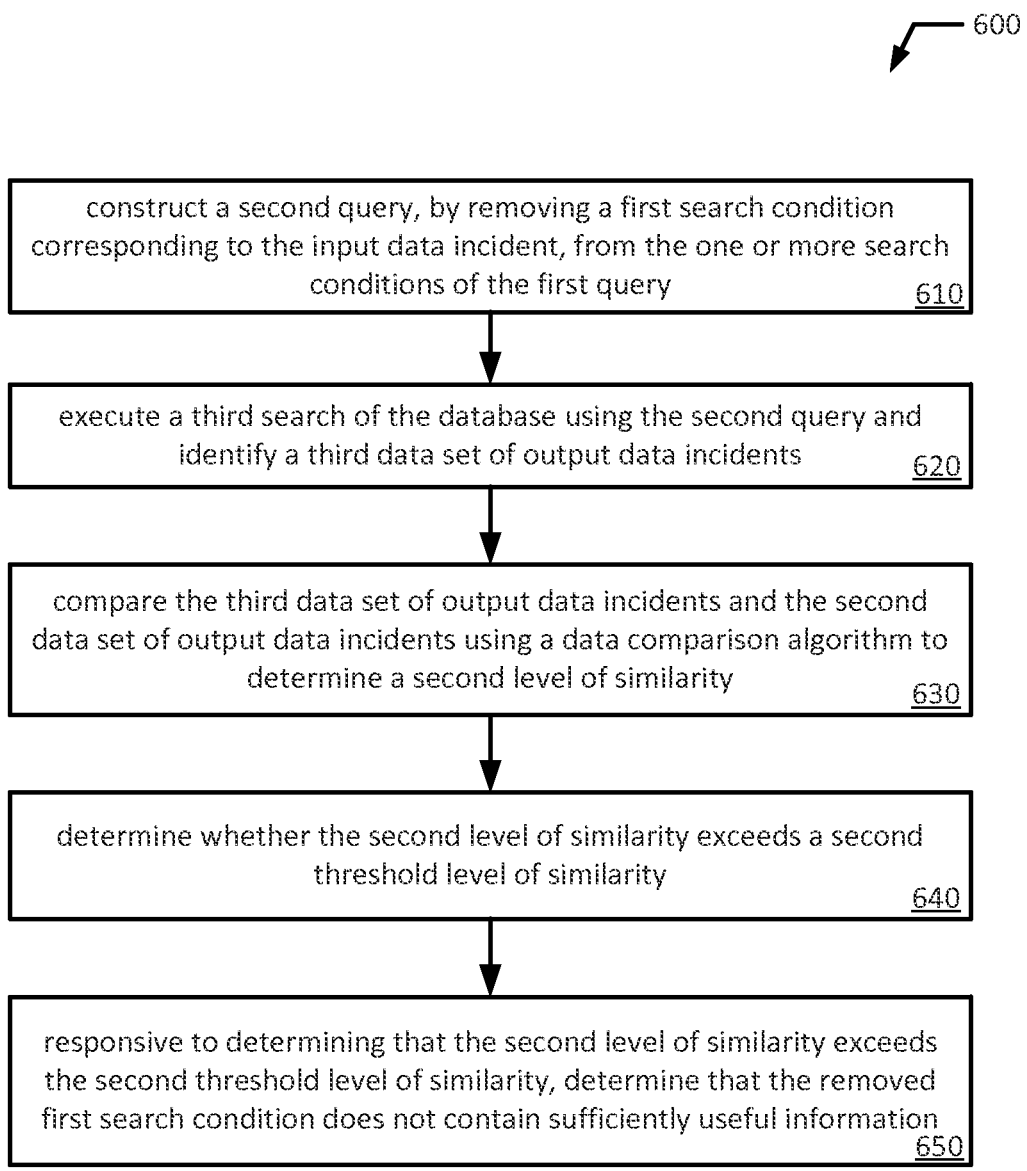
FIG. 6 is a flow chart illustrating an example process for determining whether a removed search condition contains sufficiently useful information according to an example embodiment of the present disclosure.

FIG. 6 is a flow chart illustrating an example process for determining whether a first data set contains sufficient information about a second data set according to an example embodiment of the present disclosure. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both.

The example method 600 starts and the modeling engine 150 constructs a second query by removing a first search condition corresponding to the input data incident, from the one or more search conditions of the first query (block 610). The modeling engine 150 executes a third search of the database using the second query and identify a third data set of output data incidents (block 620). The modeling engine 150 compares the third data set of output data incidents and the second data set of output data incidents using a data comparison algorithm to determine a second level of similarity (block 630). The modeling engine 150 then determines whether the second level of similarity exceeds a second threshold level of similarity (block 640). Responsive to determining that the second level of similarity exceeds the second threshold level of similarity, the modeling engine 150 determines that the removed first search condition does not contain sufficiently useful information (block 650). In this manner, a comparison is made between two different sets of output data resulting from two different sets of conditional searches to determine whether a given removed first search condition contains useful information (or is relevant to an output). In an example embodiment, the modeling engine 150 may iteratively repeat steps 610, 620, 630, 640, and 650 to eliminate additional search conditions one at a time from the first query to construct a second query and compare the output data sets resulting from each respective query to determine the relevance of each of the search conditions of the first query. Accordingly, system of the present disclosure is able to identify and optionally eliminate (e.g., at a user's request) search conditions that may be irrelevant or that may not sufficiently impact a distribution of output data incidents. In an example embodiment, the modeling engine 150 displays the second and third data sets of output data incidents and the results of the comparison (e.g., the level of similarity as compared to the threshold level of similarity) to a user or client 110. The user may then be provided with the option to either leave in or remove a given search condition.

In an example embodiment, responsive to determining that the removed first search condition does not contain sufficiently useful information, the modeling engine 150 may indicate this to a user or client 110 via the user interface module 140. For example, the modeling engine 150 may display an indication that the removing the first search condition does not impact the output. In an example embodiment, responsive to determining that the second level of similarity does not exceed the second threshold level of similarity, the modeling engine 150 determines that the removed first search condition contains sufficiently useful information. In an example embodiment, responsive to determining that the removed first search condition contains sufficiently useful information, the modeling engine 150 may indicate this to a user or client 110 via the user interface module 140.

In an example embodiment, the modeling engine 150 may construct a second query by removing a first search condition corresponding to the input data incident, from the one or more search conditions of the first query. The modeling engine 150 may further construct a third query by removing a second search condition corresponding to the input data incident, from the one or more search conditions of the first query. The modeling engine 150 may then execute a third search of the database using the second query and identify a third data set of output data incidents. The modeling engine 150 may execute a fourth search of the database using the third query and identify a fourth data set of output data incidents. The modeling engine 150 compares the third data set of output data incidents and the second data set of output data incidents using a data comparison algorithm to determine a third level of similarity. The modeling engine 150 compares the fourth data set of output data incidents and the second data set of output data incidents using a data comparison algorithm to determine a fourth level of similarity. The modeling engine 150 then determines whether the third level of similarity exceeds the fourth level of similarity. Responsive to determining that the third level of similarity exceeds the fourth level of similarity, the modeling engine 150 determines that fourth query is a more targeted query than the third query. The modeling engine 150 may display the results of this determination to a user or client 110. In this manner, a user can evaluate the relevance of a one set of search conditions as compared to a different set of search conditions.

Figure 7:
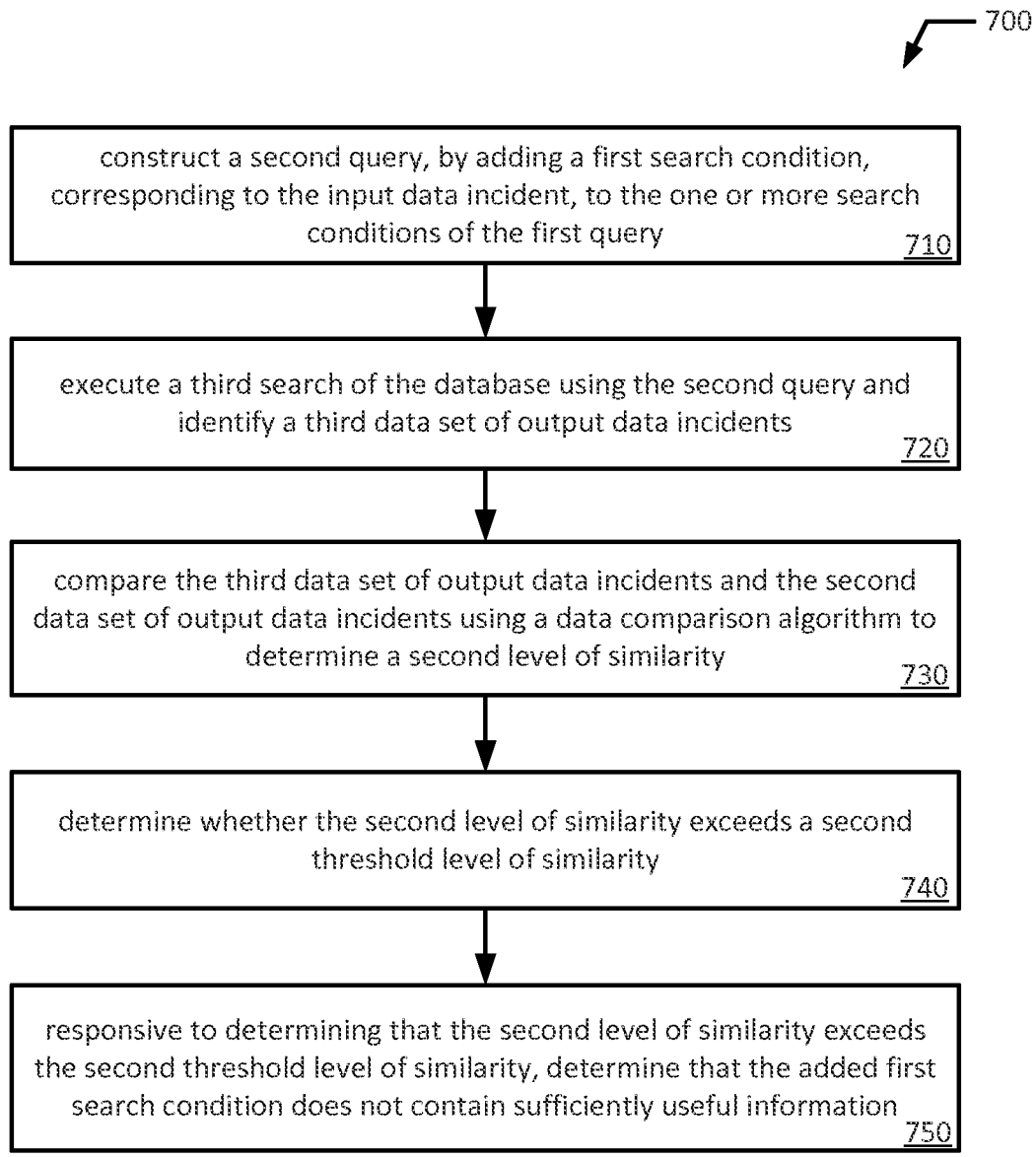
FIG. 7 is a flow chart illustrating an example process for determining whether an added search condition contains sufficiently useful information according to an example embodiment of the present disclosure.

FIG. 7 is a flow chart illustrating an example process for determining whether a first data set contains sufficient information about a second data set according to an example embodiment of the present disclosure. Although the example method 700 is described with reference to the flowchart illustrated in FIG. 7, it will be appreciated that many other methods of performing the acts associated with the method 700 may be used. For example, the order of some of the blocks may be changed, certain blocks may be combined with other blocks, and some of the blocks described are optional. The method 700 may be performed by processing logic that may comprise hardware (circuitry, dedicated logic, etc.), software, or a combination of both.

The example method 700 starts and the modeling engine 150 constructs a second query by adding a first search condition corresponding to the input data incident, to the one or more search conditions of the first query (block 710). The modeling engine 150 executes a third search of the database using the second query and identify a third data set of output data incidents (block 720). Then the modeling engine 150 compares the third data set of output data incidents and the second data set of output data incidents using a data comparison algorithm to determine a second level of similarity (block 730). It then determines whether the second level of similarity exceeds a second threshold level of similarity (block 740). Responsive to determining that the second level of similarity exceeds the second threshold level of similarity, the modeling engine 150 determines that the added first search condition does not contain sufficiently useful information (block 750). Moreover, responsive to determining that the second level of similarity does not exceed the second threshold level of similarity, the modeling engine 150 determines that the added first search condition contains sufficiently useful information. In this manner, a comparison is made between two different sets of output data resulting from two different sets of conditional searches to determine whether a given added first search condition contains useful information (or is relevant to an output). In an example embodiment, the modeling engine 150 may iteratively repeat steps 710, 720, 730, 740, and 750 to include additional search conditions one at a time from the first query to construct a second query and compare the output data sets resulting from each respective query to determine the relevance of adding potential search conditions to the first query. Accordingly, system of the present disclosure is able to identify and optionally add (e.g., at a user's request) search conditions that may be relevant or that may sufficiently impact a data set of output data incidents. In an example embodiment, the modeling engine 150 displays the second and third data sets of output data incidents and the results of the comparison (e.g., the level of similarity as compared to the threshold level of similarity) to a user or client 110. The user may then be provided with the option to include an additional search condition.

In an example embodiment, responsive to determining that the added first search condition does not contain sufficiently useful information, the modeling engine 150 may indicate this to a user or client 110 via the user interface module 140. For example, the modeling engine 150 may display an indication that the adding the first search condition does not impact the output.

In an example embodiment, the modeling engine 150 may construct a second query by adding a first search condition corresponding to the input data incident, to the one or more search conditions of the first query. The modeling engine 150 may further construct a third query by adding a second search condition corresponding to the input data incident, to the one or more search conditions of the first query. The modeling engine 150 may then execute a third search of the database using the second query and identify a third data set of output data incidents. The modeling engine 150 may execute a fourth search of the database using the third query and identify a fourth data set of output data incidents. The modeling engine 150 compares the third data set of output data incidents and the second distribution of output data incidents using a data comparison algorithm to determine a third level of similarity. The modeling engine 150 compares the fourth data set of output data incidents and the second data set of output data incidents using a data comparison algorithm to determine a fourth level of similarity. The modeling engine 150 then determines whether the third level of similarity exceeds the fourth level of similarity. Responsive to determining that the third level of similarity exceeds the fourth level of similarity, the modeling engine 150 determines that fourth query is a more targeted query than the third query. The modeling engine 150 may display the results of this determination to a user or client 110. In this manner, a user can evaluate the relevance of a one set of search conditions as compared to a different set of search conditions.

FIG. 8 is a screen shot of an example interface for enabling a user to search for and compare data sets according to an example embodiment of the present disclosure. For example, a user may be interested in evaluating the present and future risk of heart attacks (the output) based on the heart rate variations (HRV) of men between the ages of 50-60 with a particular HRV (e.g., HRV 1) (the input). The system of the present disclosure may provide the user with a particular set of fields to select from based on the data available in the database 170. The system of the present disclosure may also provide the user with the option to either conduct the search and directly look at the results (as illustrated in FIG. 10), or view a comparison of output distributions (as illustrated in FIG. 9) prior to viewing the results so that the user can evaluate whether to modify the search conditions.

Figure 9:
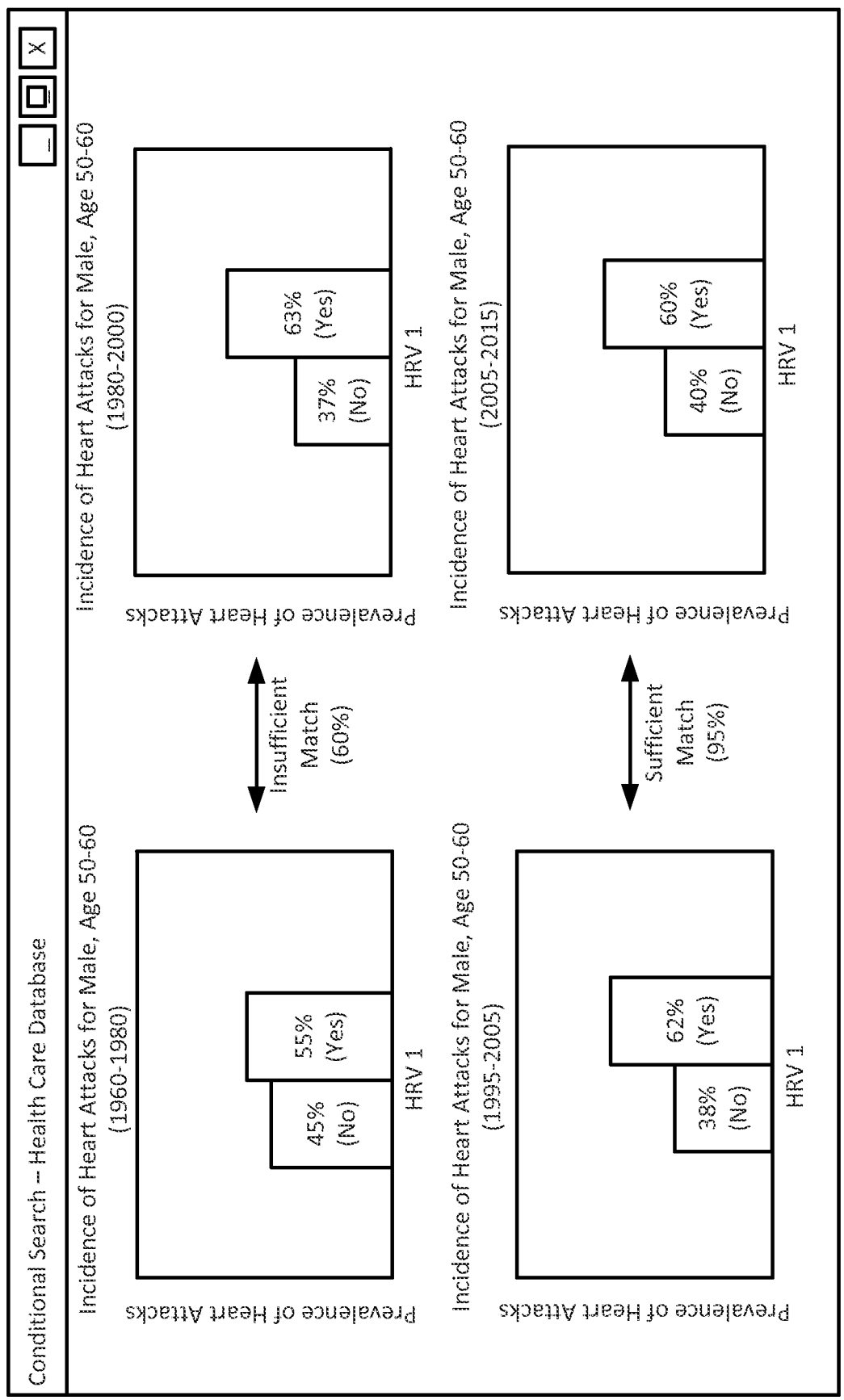
FIG. 9 is a screen shot of an example set of comparison results based on a search initiated by a user according to an example embodiment of the present disclosure.

FIG. 9 is a screen shot of an example set of comparison results based on a search initiated by a user according to an example embodiment of the present disclosure. For example, the modeling engine 150 may conduct a search of the database 170 using the input search conditions illustrated in FIG. 8 and compare the resulting distributions of the data sets of output data incidents to determine the level of similarity between different distributions the data sets of output data incidents. For example, the screen shot illustrated in FIG. 9 indicates that there is an insufficient match (i.e. level of similarity) between the incidents of heart attacks for males, ages 50-60 between the years 1960-1980 and the incidents of heart attacks for males, ages 50-60 between the years 1980-2000. Accordingly, the modeling engine 150 performed one or more additional searches to identify a sufficient match and a high level of similarity between the incidents of heart attacks for males, ages 50-60 between the years 1995-2005 and the incidents of heart attacks for males, ages 50-60 between the years 2005-2015. Based on this the modeling engine 150 determines that these latter output distributions each contain useful information regarding the other and that these output distributions potentially contain useful information regarding the present and future.

Figure 10:
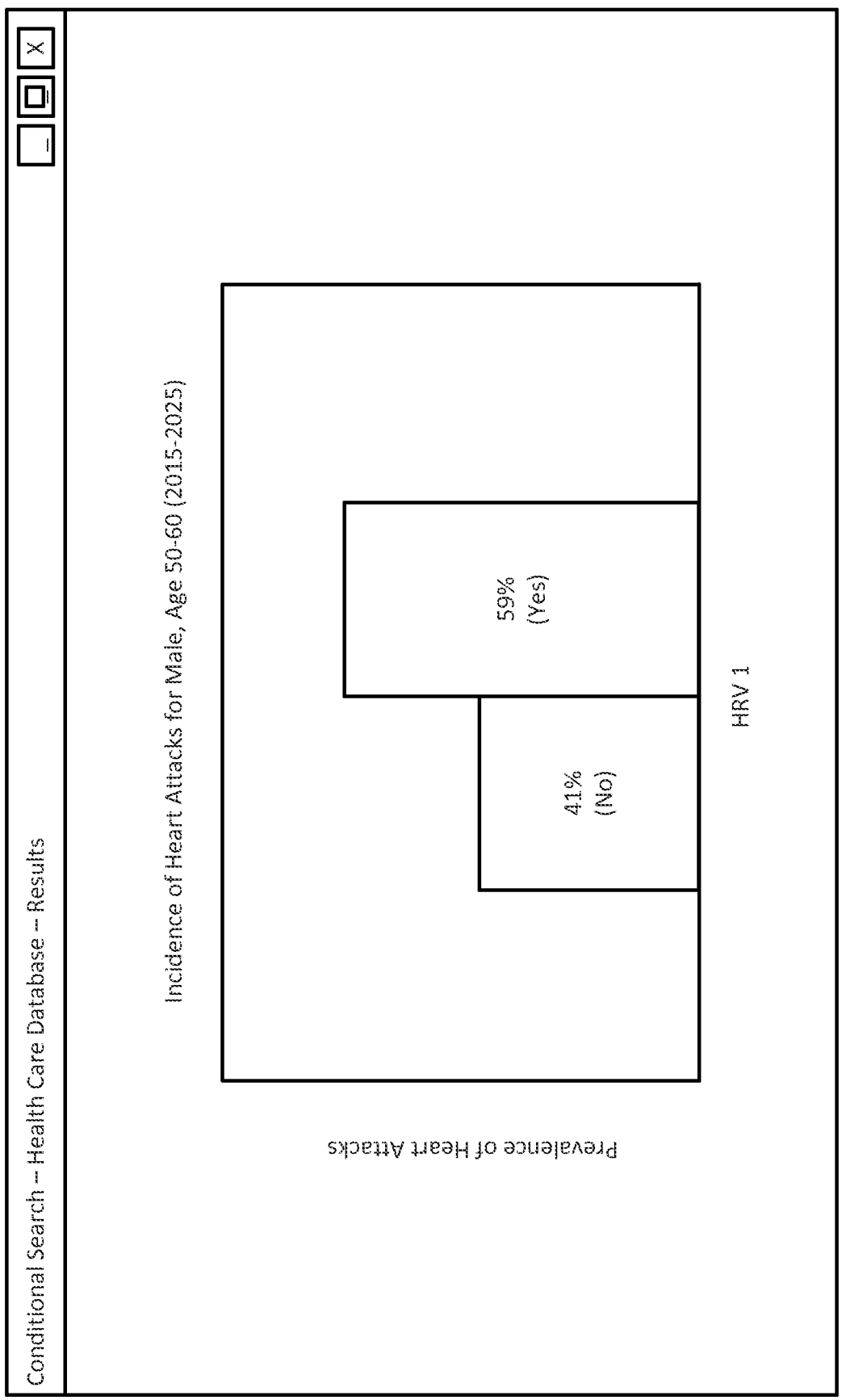
FIG. 10 is a screen shot of an example search result based on a search initiated by a user according to an example embodiment of the present disclosure.

FIG. 10 is a screen shot of an example search result based on a search initiated by a user according to an example embodiment of the present disclosure. FIG. 10 illustrates a predictive distribution of the data sets of output data incidents based on the modeling engine's 150 search and analysis of output data distributions corresponding to the search conditions of one or more input data incidents. For example, the modeling engine 150 extrapolates information using the distributions of the data sets of output data incidents of heart attacks for males, ages 50-60 between the years 1995-2005 and the incidents of heart attacks for males, ages 50-60 between the years 2005-2015. Based on this extrapolation, the modeling engine predicts (and displays to the user or client 110) that for males, ages 50-60 in 2015-2025 period with HRV 1, there is a 41% likelihood of no heart attacks occurring and a 59% likelihood of heart attacks occurring. As discussed with reference to FIGS. 7 and 8, the modeling engine 150 may optionally add or remove search conditions to evaluate whether the included search conditions contain useful information or whether other additional search conditions might provide further useful information. For example, the system may determine that the distribution of the data set of outputs corresponding to HRV 2 and HRV 3 are sufficiently similar to those corresponding to HRV 1 that the user may be interested in output incidents corresponding to these additional heart rate variations as well. The modeling engine 150 may then suggest a search that includes these additional heart rate variations to the user or client 110.

FIG. 11 is a screen shot of an example interface for enabling a user to search for and compare data sets according to an example embodiment of the present disclosure.

For example, a user may be interested in determining the likely future central processing unit (CPU) usage of a particular CPU based on its present CPU usage. In accordance with this, the system of the present disclosure may provide the user with a particular set of fields to select from based on the data available in the database 170. For example, inputs may include a particular CPU, a CPU usage metric, and other CPUs of interest to the user and outputs of interest may be the future CPU usage of the particular CPU. In an example embodiment, a user may also be interested in the likelihood of server crashes based on an input CPU usage. The system of the present disclosure may also provide the user with the option to either conduct the search and directly look at the results (as illustrated in FIG. 13), or view a comparison of output distributions (as illustrated in FIG. 12) prior to viewing the results so that the user can evaluate whether to modify the search conditions.

Figure 12:
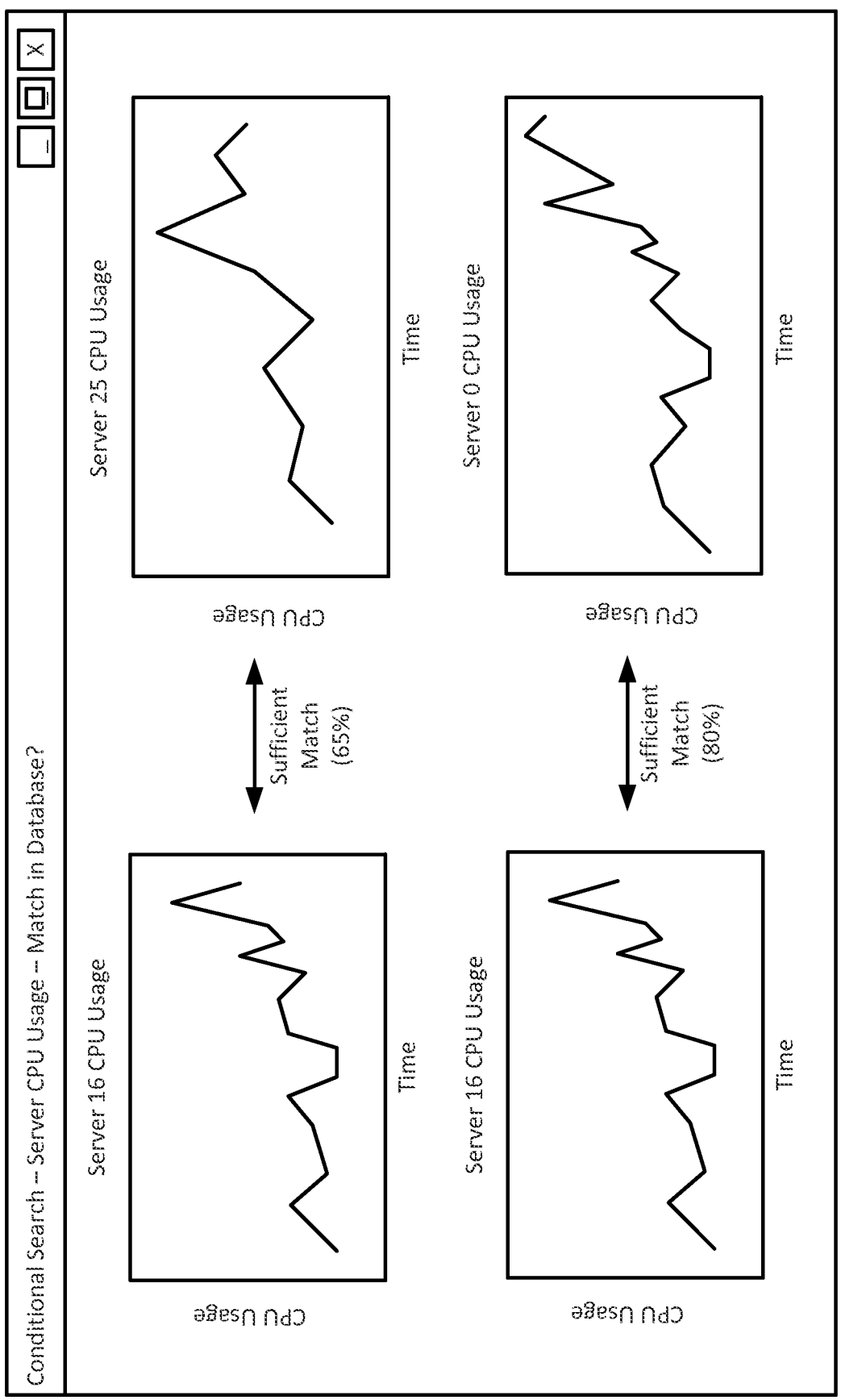
FIG. 12 is a screen shot of an example set of comparison results based on a search initiated by a user according to an example embodiment of the present disclosure.

FIG. 12 is a screen shot of an example set of comparison results based on a search initiated by a user according to an example embodiment of the present disclosure. For example, the modeling engine 150 may conduct a search of the database 170 using the input search conditions illustrated in FIG. 11 and compare the resulting distributions of the data sets of output data incidents to determine the level of similarity between different distributions of the data sets of output data incidents. For example, the screen shot illustrated in FIG. 12 indicates that there is an sufficient match (i.e. level of similarity) between the CPU usage of server 16 and the CPU usage of server 25. The screen shot further indicates that the modeling engine 150 has determined that there is a sufficient match between the CPU usage of server 16 and the CPU usage of server 0. Accordingly, the modeling engine may determine that both server 25 and server 0 can be used to predict the future CPU usage of server 16.

Figure 13:
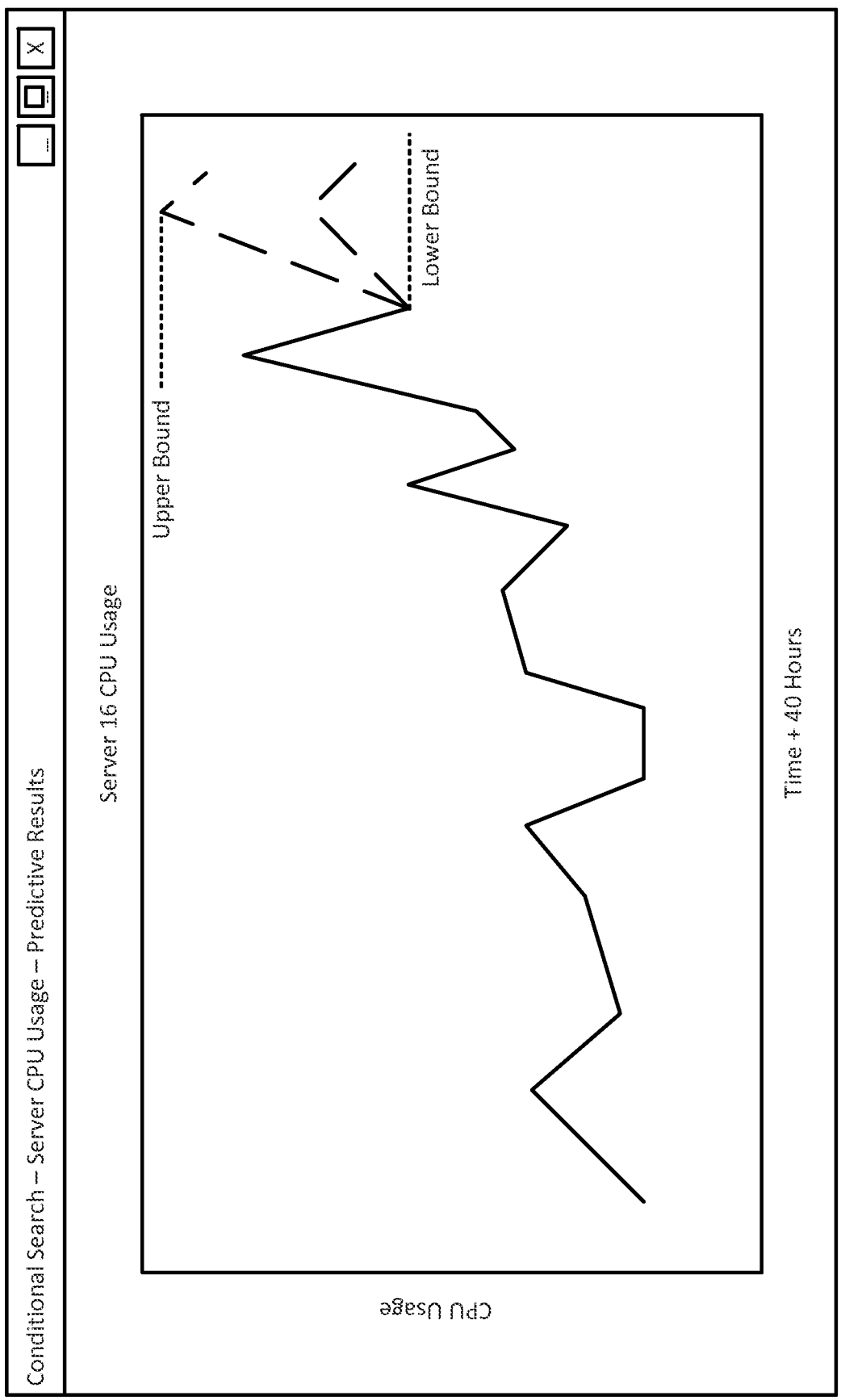
FIG. 13 is a screen shot of an example predictive search result based on a search initiated by a user according to an example embodiment of the present disclosure.

FIG. 13 is a screen shot of an example predictive search result based on a search initiated by a user according to an example embodiment of the present disclosure. FIG. 13 illustrates the past CPU usage of server 16 in a solid line and the displayed dashed line indicates potential future patterns of CPU usage for server 16. In an example embodiment, the upper bound output pattern is extrapolated from the CPU usage of server 0 and the lower bound output pattern is extrapolated from the CPU usage of server 25. The system of the present disclosure may also display an indication that the upper bound output pattern is the most likely potential outcome based on the determination that the distribution of CPU usage of server 0 had the highest level of similarity to the distribution of CPU usage of server 16. One of ordinary skill in the art would understand that the system of the present disclosure may be used in a number of additional applications including at least those described as feature categories and feature examples in Table 1.

Although the above description has focused on describing embodiments of the disclosed system that operate on and/or generate "data sets," it should be appreciated that other arrangements of data are contemplated for use with the disclosed system. Specifically, so-called distributions, which are a specific kind of data set that reflect the likelihood, probability or frequency of the individual data points within the data set, are particularly well-suited for generation using the techniques described herein. Moreover, it will be appreciated that references to "distributions" are to be understood as example "data sets."

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for providing intelligent database search results comprising:
    a database;
    a client computer system;
    a server computer system, including one or more processors, in communication with a memory; and
    a modeling engine executing on the server computer system to:
        receive a first query including (a) one or more search conditions corresponding to an input data incident and (b) an output category for which information is sought;
        execute a first search of the database using the first query and identify, for the output category, a first data set of output data incidents corresponding to a first time period;
        execute a second search of the database using the first query and identify, for the output category, a second data set of output data incidents corresponding to a second time period;
        compare the first data set of output data incidents and the second data set of output data incidents using a data comparison algorithm to determine a first level of similarity;
        determine whether the first level of similarity exceeds a first threshold level of similarity; and
        responsive to determining that the first level of similarity exceeds the first threshold level of similarity:
            determine that the first data set of output data incidents contains sufficient information for further processing of the second data set of output data incidents, the further processing comprising at least a prediction operation based on the first data set of output data incidents and the second data set of output data incidents;
            perform the prediction operation based on the first data set of output data incidents and the second data set of output data incidents; and display a result of the prediction operation,
wherein the input data incident and each of the first and second data sets of output data incidents represents a relationship between at least two features, and
wherein both the first time period and the second time period occur before receiving the first query.

2. The system of claim 1, wherein, responsive to determining that the first data set of output data incidents contains sufficient information for the further processing of the second data set of output data incidents, the modeling engine executes on the server computer system to:
construct, for the output category, a third data set of output data incidents corresponding to a third time period, wherein the third data set of output data incidents is extrapolated or aggregated from at least one of the first data set of output data incidents and the second data set of output data incidents; and
responsive to constructing the third data set of output data incidents, display, by the modeling engine, a visual representation of the third data set of output data incidents, a distribution of the third data set of output data incidents, and/or statistical properties of the third data set of output data incidents.

3. The system of claim 2, wherein, responsive to determining that the first data set of output data incidents contains sufficient information about the second data set of output data incidents, the modeling engine further executes on the server computer system to determine a confidence level based on the first level of similarity.

4. The system of claim 3, wherein displaying the visual representation of the third data set of output data incidents includes displaying, by the modeling engine, the confidence level, a distribution of the confidence level, and/or statistical properties of the confidence level.

5. The system of claim 1, wherein responsive to determining that the first level of similarity does not exceed the first threshold level of similarity, the modeling engine executes on the server computer system to determine that the first data set of output data incidents does not contain sufficient information for the further processing of the second data set of output data incidents.

6. The system of claim 5, wherein responsive to determining that the first data set of output data incidents does not contain sufficient information for the further processing of the second data set of output data incidents, the modeling engine executes on the server computer system to:
execute a third search of the database using the first query and identify for the output category a third data set of output data incidents corresponding to a third time period;
compare the third data set of output data incidents and the second data set of output data incidents using a data comparison algorithm to determine a second level of similarity;
determine whether the second level of similarity exceeds a second threshold level of similarity;
responsive to determining that the second level of similarity exceeds the second threshold level of similarity, determine that the third data set of output data incidents contains sufficient information about the second data set of output data incidents for the further processing of the second data set.

7. The system of claim 5, wherein responsive to determining that the first data set of output data incidents does not contain sufficient information about the second data set of output data incidents, the modeling engine executes on the server computer system to:

execute a third search of the database using the first query and identify, for the output category, a third data set of output data incidents corresponding to a third time period;
execute a fourth search of the database using the first query and identify, for the output category, a fourth data set of output data incidents corresponding to a fourth time period;
compare the third data set of output data incidents and the fourth data set of output data incidents using a data comparison algorithm to determine a second level of similarity;
determine whether the second level of similarity exceeds a second threshold level of similarity;
responsive to determining that the second level of similarity exceeds the second threshold level of similarity, determine that the third data set of output data incidents contains sufficient information for further processing of the fourth data set of output data incidents.

8. The system of claim 1, wherein the data comparison algorithm comprises an empirical probability distribution comparison algorithm, the empirical probability distribution comparison algorithm comprising a path matching algorithm in which the distribution paths of different data sets are compared based on at least one of: a quantity of path matches, a mean value, a standard deviation, a skew, a kurtosis, a Kolmogorov-Smirnov (KS) test statistics, a T test statistics, a weighted Euclidean distance measure, a weighted correlation measure, a Kullback-Leibler (KL) divergence measure, a mutual information measure, and a chi-square test statistic.

9. The system of claim 2, wherein displaying a visual representation of the third data set of output data incidents set includes displaying, by the modeling engine, at least one of a most likely potential output data incident, a distribution of the most likely potential output data incident, and statistical properties of the most likely potential output data incident.

10. The system of claim 1, wherein the modeling engine executes on the server computer system to further:
construct a second query by removing a first search condition corresponding to the input data incident from the one or more search conditions of the first query;
execute a third search of the database using the second query and identify a third data set of output data incidents;
compare the third distribution of output data incidents and the second data set of output data incidents using a data comparison algorithm to determine a second level of similarity;
determine whether the second level of similarity exceeds a second threshold level of similarity;
responsive to determining that the second level of similarity exceeds the second threshold level of similarity, determine that the removed first search condition does not contain sufficiently useful information for the further processing of the second data set of output data incidents.

11. The system of claim 10, wherein responsive to determining that the removed first search condition does not contain sufficiently useful information, the modeling engine executes on the server computer system to display an indication that removing the first search condition does not impact the output.

12. The system of claim 1, wherein the modeling engine executes on the server computer system to further:

construct a second query by adding a first search condition corresponding to the input data incident to the one or more search conditions of the first query;

execute a third search of the database using the second query and identify a third data set of output data incidents;

compare the third data set of output data incidents and the second data set of output data incidents using a data comparison algorithm to determine a second level of similarity;

determine whether the second level of similarity exceeds a second threshold level of similarity;

responsive to determining that the second level of similarity exceeds the second threshold level of similarity, determine that the added first search condition does not contain sufficiently useful information for the further processing of the second data set of output data incidents.

13. The system of claim 12, wherein responsive to determining that the first search condition does not contain sufficiently useful information for the further processing of the second data set of output data incidents, the modeling engine executes on the server computer system to display an indication that adding the first search condition does not impact the output.

14. The system of claim 1, wherein the further processing of the second data set further includes at least one of a smoothing operation and a filtering operation performed prior to the prediction operation.

15. The system of claim 1, wherein the modeling engine further executes on the server computer system to:

display a first visual indication of the first data set of output data incidents and a second visual indication of the second data set of output data incidents;

receive a second query including updated search conditions; and perform a third search using the updated search conditions.

* * * * *